United States Patent
Gokmen

(10) Patent No.: US 10,956,815 B2
(45) Date of Patent: *Mar. 23, 2021

(54) KILLING ASYMMETRIC RESISTIVE PROCESSING UNITS FOR NEURAL NETWORK TRAINING

(71) Applicant: INTERNATIONAL BUSINESS MACHINES CORPORATION, Armonk, NY (US)

(72) Inventor: Tayfun Gokmen, Briarcliff Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 967 days.

This patent is subject to a terminal disclaimer.

(21) Appl. No.: 15/609,691

(22) Filed: May 31, 2017

(65) Prior Publication Data

US 2018/0075350 A1 Mar. 15, 2018

Related U.S. Application Data

(63) Continuation of application No. 15/262,582, filed on Sep. 12, 2016, now Pat. No. 9,715,656.

(51) Int. Cl.
G06N 3/08 (2006.01)
G06N 3/063 (2006.01)

(52) U.S. Cl.
CPC .............. *G06N 3/08* (2013.01); *G06N 3/063* (2013.01); *G06N 3/084* (2013.01)

(58) Field of Classification Search
CPC ........... G06N 3/08; G06N 3/082; G06N 3/063
See application file for complete search history.

(56) References Cited

U.S. PATENT DOCUMENTS

| 5,058,049 A | 10/1991 | Anderson |
| 7,302,513 B2 | 11/2007 | Mouttet |

(Continued)

FOREIGN PATENT DOCUMENTS

| JP | H05282272 A | 10/1993 |
| JP | H07121498 A | 5/1995 |

(Continued)

OTHER PUBLICATIONS

Hongal, Veeresh A., et al. "A novel "divide and conquer" testing technique for memristor based lookup table." 2011 IEEE 54th International Midwest Symposium on Circuits and Systems (MWSCAS). IEEE, 2011. (Year: 2011).*

(Continued)

*Primary Examiner* — Eric Nilsson
(74) *Attorney, Agent, or Firm* — Cantor Colburn LLP; Randall Bluestone

(57) ABSTRACT

Technical solutions are described for improving efficiency of training a resistive processing unit (RPU) array using a neural network training methodology. An example method includes reducing asymmetric RPUs from the RPU array by determining an asymmetric value of an RPU from the RPU array, and burning the RPU in response to the asymmetry value being above a predetermined threshold. The RPU can be burned by causing an electric voltage across the RPU to be above a predetermined limit. The method further includes initiating the training methodology for the RPU array after the asymmetric RPUs from the RPU array are reduced.

20 Claims, 20 Drawing Sheets

(56) References Cited

U.S. PATENT DOCUMENTS

| | | | |
|---|---|---|---|
| 7,398,259 | B2 | 7/2008 | Nugent |
| 7,525,833 | B2 | 4/2009 | Snider et al. |
| 7,902,867 | B2 | 3/2011 | Mouttet |
| 8,391,049 | B2 | 3/2013 | Jo |
| 8,510,244 | B2 | 8/2013 | Carson et al. |
| 8,731,071 | B1* | 5/2014 | Kimura .............. G06T 1/20 375/240.29 |
| 8,832,009 | B2 | 9/2014 | Rose et al. |
| 9,041,389 | B2 | 5/2015 | Gokmen et al. |
| 9,092,736 | B2 | 7/2015 | Aparin et al. |
| 9,203,022 | B2 | 12/2015 | Hopstaken et al. |
| 9,389,273 | B2 | 7/2016 | Gokmen et al. |
| 9,400,306 | B2 | 7/2016 | Gokmen et al. |
| 9,443,997 | B2 | 9/2016 | Gokmen et al. |
| 9,601,546 | B1 | 3/2017 | Ando et al. |
| 9,608,160 | B1 | 3/2017 | Bayram et al. |
| 9,659,249 | B1 | 5/2017 | Copel et al. |
| 9,779,355 | B1 | 10/2017 | Leobandung et al. |
| 9,852,790 | B1 | 12/2017 | Gokmen et al. |
| 9,887,351 | B1 | 2/2018 | Ando et al. |
| 9,997,704 | B2 | 6/2018 | Ando et al. |
| 10,079,341 | B1 | 9/2018 | Bedell et al. |
| 10,096,773 | B1 | 10/2018 | Ando et al. |
| 10,115,800 | B1 | 10/2018 | Kim et al. |
| 10,141,509 | B2 | 11/2018 | Ando et al. |
| 10,153,159 | B1 | 12/2018 | Kim et al. |
| 10,186,657 | B2 | 1/2019 | Brew et al. |
| 2008/0089110 | A1 | 4/2008 | Robinett et al. |
| 2011/0153533 | A1 | 6/2011 | Jackson et al. |
| 2014/0156576 | A1 | 6/2014 | Nugent |
| 2014/0172937 | A1 | 6/2014 | Linderman et al. |
| 2014/0215121 | A1* | 7/2014 | Ordentlich .......... G06F 11/1096 711/102 |
| 2015/0036920 | A1 | 2/2015 | Wu et al. |
| 2015/0106314 | A1 | 4/2015 | Birdwell et al. |
| 2015/0170025 | A1 | 6/2015 | Wu et al. |
| 2015/0171868 | A1 | 6/2015 | Rodriguez et al. |
| 2015/0294219 | A1 | 10/2015 | Krizhevsky |
| 2015/0347897 | A1 | 12/2015 | Modha |
| 2015/0379395 | A1* | 12/2015 | Pickett ................ G06N 3/0635 706/27 |
| 2016/0049195 | A1 | 2/2016 | Yu et al. |
| 2016/0117587 | A1 | 4/2016 | Yan |
| 2016/0148078 | A1 | 5/2016 | Xiaohui et al. |
| 2016/0162782 | A1 | 6/2016 | Park |
| 2018/0005110 | A1 | 1/2018 | Gokmen et al. |
| 2018/0089559 | A1 | 3/2018 | Copel et al. |

FOREIGN PATENT DOCUMENTS

| | | |
|---|---|---|
| JP | H07139507 A | 12/1995 |
| WO | 2016030230 A1 | 3/2016 |

OTHER PUBLICATIONS

Chippa et al., "StoRM: a stochastic recognition and mining processor," 2014 International Symposium on Low Power Electronics and Design, 2014, pp. 39-44.

Chua, "Resistance switching memories are memristors," Applied Physics A, vol. 102, No. 4, 2011, pp. 765-783.

Lehmann et al., "A Generic Systolic Array Building Block for Neural Networks with On-Chip Learning," IEEE Transactions on Neural Networks, vol. 4, No. 3, 1993, pp. 400-407.

Li et al., "Training itself: Mixed-signal training acceleration for memristor-based neural network," 19th Asia and South Pacific Design Automation Conference (ASP-DAC), 2014, pp. 361-366.

Pershin et al., "Solving mazes with memristors: A massively parallel approach," Physical Review E, vol. 84, No. 4, 2011, 046703, 6 pages.

Soudry et al., "Memristor-Based Multilayer Neural Networks With Online Gradient Descent Training," IEEE Transactions on Neural Networks and Learning Systems, 2015.

Alibart et al., "Pattern Classification by Memristive Crossbar Circuits using Ex Situ and in Situ Training", Nature Communications, Jun. 25, 2013, pp. 1-7.

Nano Letters Nanoscale Memristor Device as Synapse in Neuromorphic Systems, Sung Hyun Jo, Ting Chang, Idongesit Ebong, Bhavitavya B. Bhadviya, Pinaki Mazumder, and Wei Lu Department of Electrical Engineering and Computer Science, University of Michigan, Michigan 48109 pp. 1297-1301.

Garbin et al., "Variability-tolerant Convolutional Neural Network for Pattern Recognition Applications based on OxRAM Synapses," IEEE, International Electron Devices Meeting, 2014, pp. 28.4.1-28.4.4.

Gokmen et al., "Acceleration of Deep Neural Network Training with Resistive Cross-Point Devices," IBM T.J. Watson Research Center, arXiv:1603.07341, Dec. 14, 2015, pp. 1-19.

ScienceDirect Elsevier Neurocomputing vol. 74, Issues 1-3, Dec. 2010, pp. 239-255 Artificial neural networks in hardware: A survey of two decades of progress Janardan Misra, Indranil Saha.

IEEE Xplore, A CMOS Spiking Neuron for Brain-Inspired Neural Networks With Resistive Synapses and In Situ Learning Published in: IEEE Transactions on Circuits and Systems II: Express Briefs ( vol. 62 , Issue: 11 , Nov. 2015 ) Xinyu Wu; Vishal Saxena; Kehan Zhu; Sakkarapani Balagopa pp. 1088-1092 IEEE.

List of IBM Patents or Patent Applications Treated as Related; Date Filed: Oct. 14, 2 pages.

Stutz, "Understanding Convolutional Neural Networks", Seminar Report, Aug. 30, 2014, pp. 1-23.

List of IBM Patents or Patent Applications Treated as Related; (Appendix P), Filed Jun. 16, 2017; 2 pages.

Tayfun Gokmen "Killing Asymmetric Resistive Processing Units for Neural Network Training", U.S. Appl. No. 15/262,582, filed Sep. 12, 2016.

Tayfun Gokmen et al., "Resistive Processing Unit", U.S. Appl. No. 14/966,394, filed Dec. 11, 2015.

Tayfun Gokmen et al., "Resistive Processing Unit", U.S. Appl. No. 14/887,564, filed Oct. 20, 2015.

Tayfun Gokmen, "Convolutional Neural Networks Using Resistive Processing Unit Array", U.S. Appl. No. 15/262,606, filed Sep. 12, 2016.

* cited by examiner f(x) = f (INPUT 1 * CONNECTION STRENGTH 1 + INPUT 2 * CONNECTION STRENGTH 2)

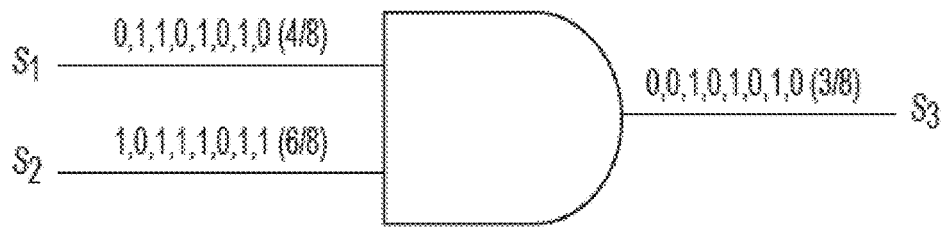
FIG. 5
$$i = g(s,v)v \qquad \text{EQUATION [1]}$$
$$\frac{\partial s(t)}{\partial t} = f(s,v) \qquad \text{EQUATION [2]}$$
FIG. 6
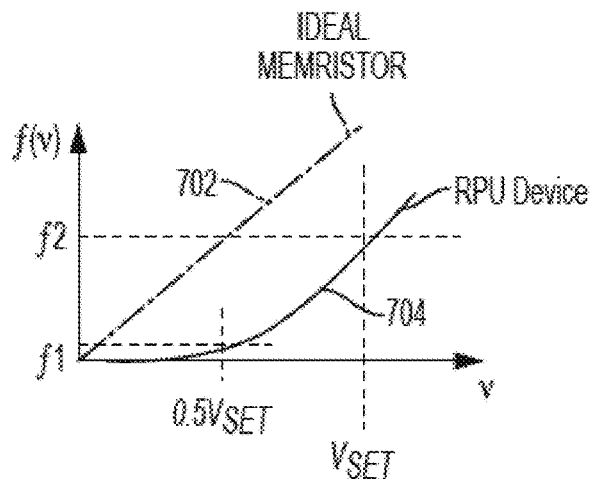
FIG. 7

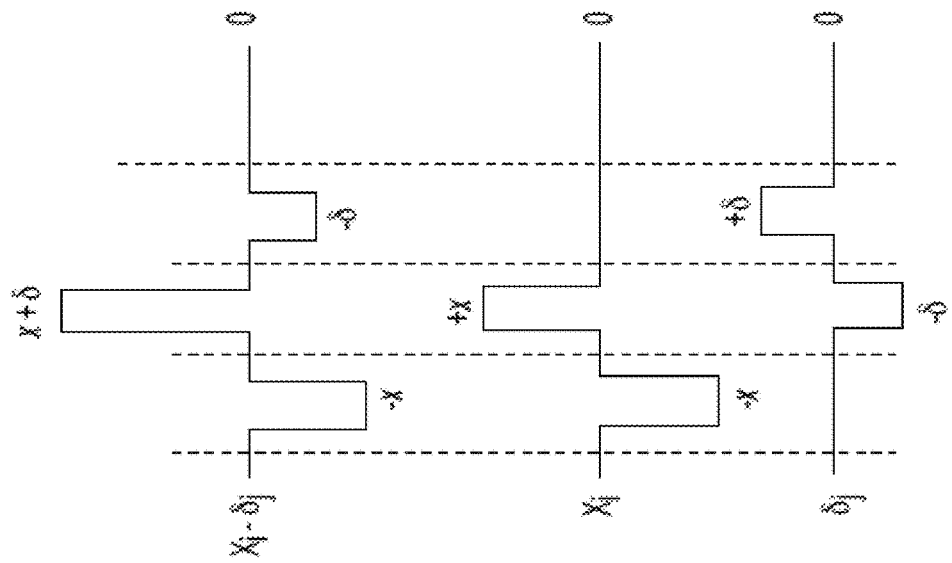
VOLTAGE HEIGHT MODULATION FOR LOCAL MULTIPLICATION
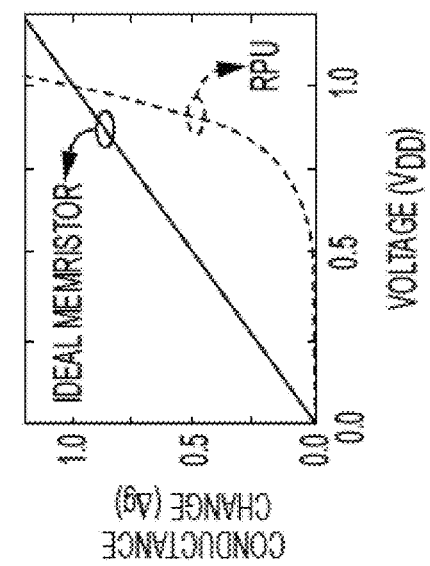
ASSUME $\quad \Delta g \sim (e^V - 1)$
THEN $\quad \Delta w = (e^{x+\delta} - 1) - (e^x - 1) - (e^\delta - 1)$
CAN BE ACHIEVED BY SENDING 3 PULSES WHERE HEIGHTS MODULATED DEPENDING ON x AND δ VALUES AS SHOWN ON THE RIGHT
FIG. 14

VOLTAGE HEIGHT MODULATION FOR LOCAL MULTIPLICATION - CONTINUED

THE FIRST TWO TERMS OF THE TAYLOR EXPANSION GIVES THE FOLLOWING RESULTS

EXPONENTIAL FUNCTION:
$$e^x = \sum_{n=0}^{\infty} \frac{x^n}{n!} = 1 + x + \frac{x^2}{2!} + \frac{x^3}{3!} + \ldots \text{ FOR ALL } x$$

$$\Delta w = (e^{x+\delta} - 1) - (e^x - 1) - (e^\delta - 1)$$

$$\Delta w = (1 + (x+\delta)) + \frac{(x+\delta)^2}{2} - 1) - (1 + (x) + \frac{(x)^2}{2} - 1) - (1 + (\delta) + \frac{(\delta)^2}{2} - 1)$$

ABOVE EQUATION SIMPLIFIES TO $\Delta w = x\delta$

THIS DEMONSTRATES THAT THE HIGHER ORDER TERMS DO NOT MATTER, AND THE DISCLOSED UPDATE METHODOLOGIES WORK AS WELL AS THE PERFECT MULTIPLICATION CASE AS SHOWN ON THE DIAGRAM TO THE RIGHT

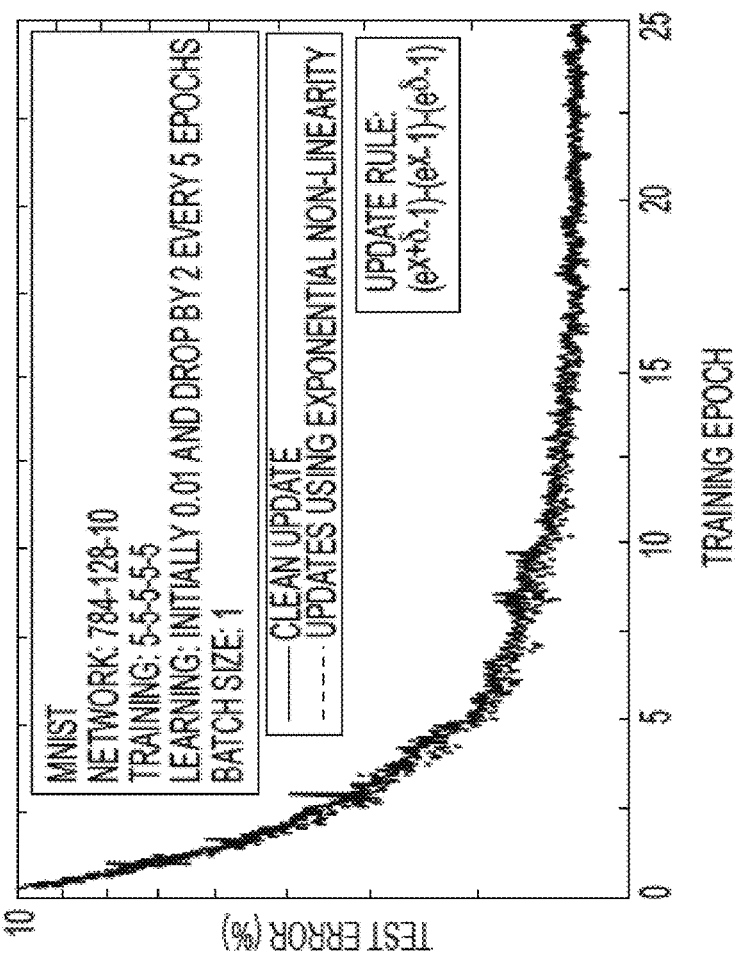

FIG. 15

KILLING ASYMMETRIC RESISTIVE PROCESSING UNITS FOR NEURAL NETWORK TRAINING

PRIORITY

This application is a continuation of and claims priority from U.S. patent application Ser. No. 15/262,582, filed on Sep. 12, 2016, entitled "KILLING ASYMMETRIC RESISTIVE PROCESSING UNITS FOR NEURAL NETWORK TRAINING", the entire contents of which are incorporated herein by reference.

BACKGROUND

The present invention relates in general to novel configurations of trainable resistive crosspoint devices, which are referred to herein as resistive processing units (RPUs). More specifically, the present invention relates to artificial neural networks (ANNs) formed from crossbar arrays of two-terminal RPUs that provide local data storage and local data processing without the need for additional processing elements beyond the two-terminal RPU, thereby accelerating the ANN's ability to learn and implement algorithms such as online neural network training, matrix inversion, matrix decomposition and the like.

"Machine learning" is used to broadly describe a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown. Crossbar arrays are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

SUMMARY

According to one or more embodiments, resistive processing unit (RPU) array includes a set of conductive row wires, a set of conductive column wires configured to form crosspoints at intersections between the set of conductive row wires and the set of conductive column wires, and multiple two-terminal RPUs, wherein a two-terminal RPU is located at each of the plurality of crosspoints, wherein a conduction state of an RPU identifies a weight of a training methodology applied to said RPU. The RPU array unit receives one or more electric signals that burn a selected subset of RPUs from the plurality of the RPUs.

According to one or more embodiments, a neuron control system facilitating training a resistive processing unit (RPU) array, includes the RPU array, which includes multiple of RPUs, and a processor that controls electric voltage across each RPU from the RPU array. The processor further reduces asymmetric RPUs from the RPU array by determining an asymmetric value of an RPU from the RPU array, and burning the RPU in response to the asymmetry value being above a predetermined threshold. The processor burns the RPU by causing the electric voltage across the RPU to be above a predetermined limit.

According to one or more embodiments, computer program product for training a resistive processing unit (RPU) array, includes computer readable storage medium with computer executable instructions embedded therein. The computer readable storage medium includes instructions to reduce asymmetric RPUs from the RPU array by determining an asymmetric value of an RPU from the RPU array, and burning the RPU in response to the asymmetry value being above a predetermined threshold. The RPU is burned by causing an electric voltage across the RPU to be above a predetermined limit. The computer readable storage medium also includes instructions to initiate a training methodology for the RPU array after the asymmetric RPUs from the RPU array are reduced.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 5 depicts a simplified block diagram of a stochastic computing methodology capable of being used in one or more embodiments;

FIG. 6 depicts known equations that govern the operation of a passive, two-terminal memristor;

FIG. 7 depicts a graphical comparison between the linear switching characteristic of a known two-terminal memristor and the non-linear switching characteristic of a two-terminal RPU according to embodiments of the present invention;

FIG. 14 depicts graphs, diagrams and equations illustrating a height-modulation weight update methodology using a two-terminal RPU having an exponential non-linearity according to one or more embodiments;

FIG. 15 depicts graphs and equations further illustrating a height-modulation weight update methodology using a two-terminal, non-linear RPU according to one or more embodiments;

DETAILED DESCRIPTION

Figure 1:
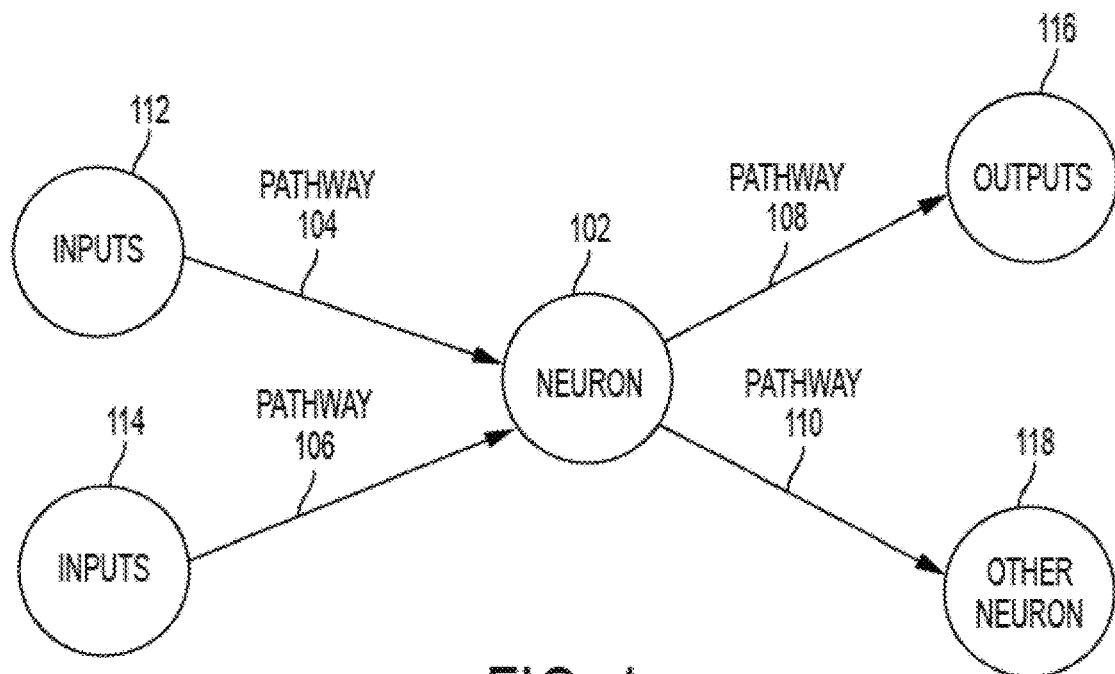
FIG. 1 depicts a simplified diagram of input and output connections of a biological neuron.

It is understood in advance that although one or more embodiments are described in the context of biological neural networks with a specific emphasis on modeling brain structures and functions, implementation of the teachings recited herein are not limited to modeling a particular environment. Rather, embodiments of the present invention are capable of modeling any type of environment, including for example, weather patterns, arbitrary data collected from the internet, and the like, as long as the various inputs to the environment can be turned into a vector.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

Although embodiments of the present invention is directed to an electronic system, for ease of reference and explanation various aspects of the electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
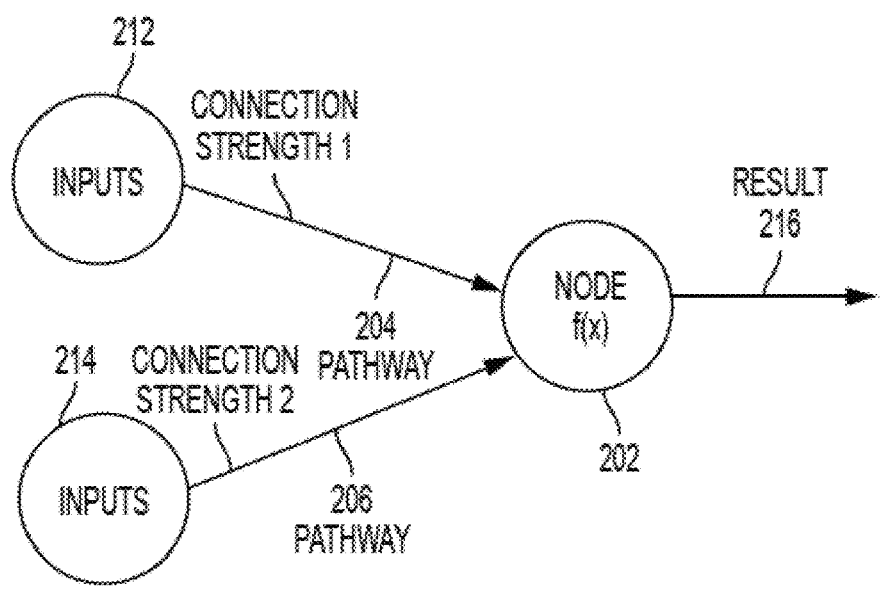
FIG. 2 depicts a known simplified model of the biological neuron shown in FIG. 1.
Figure 3:
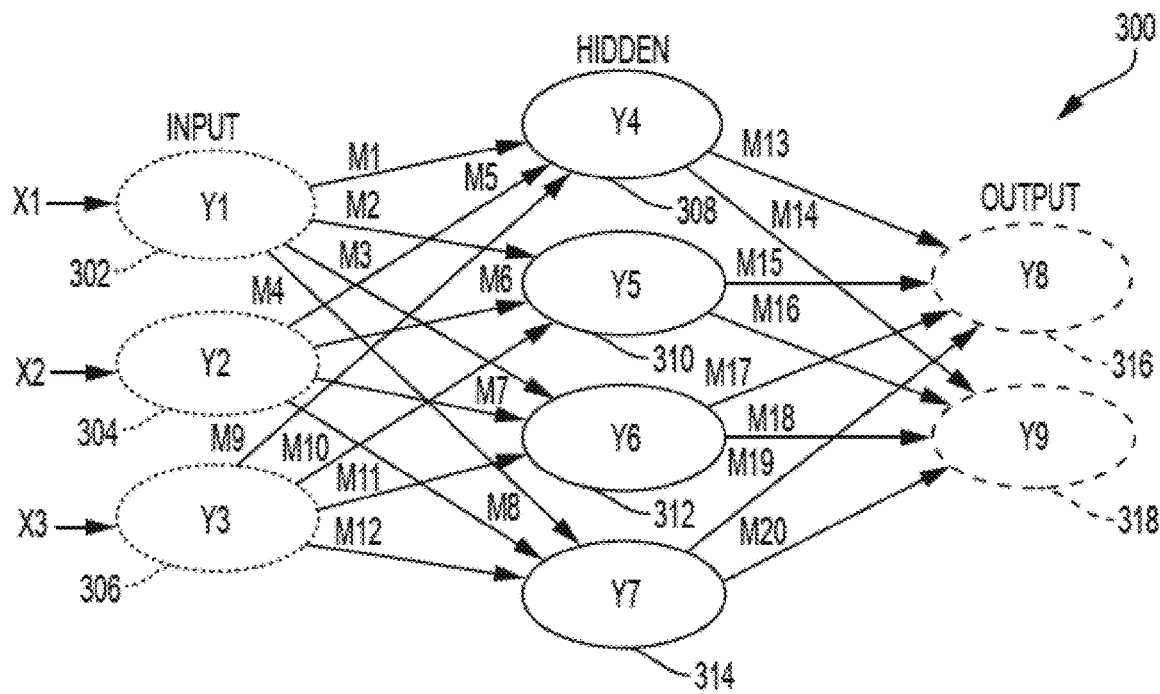
FIG. 3 depicts a known simplified model of an ANN incorporating the biological neuron model shown in FIG. 2.

As background, a general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, $y1=f(x1)$, $y2=f(x2)$ and $y3=f(x3)$, as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, $y4=f(m1*y1+m5*y2+m9*y3)$, wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it can become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feedforward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm can be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire description of which is incorporated by reference herein.

As previously noted herein, in order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Figure 4:
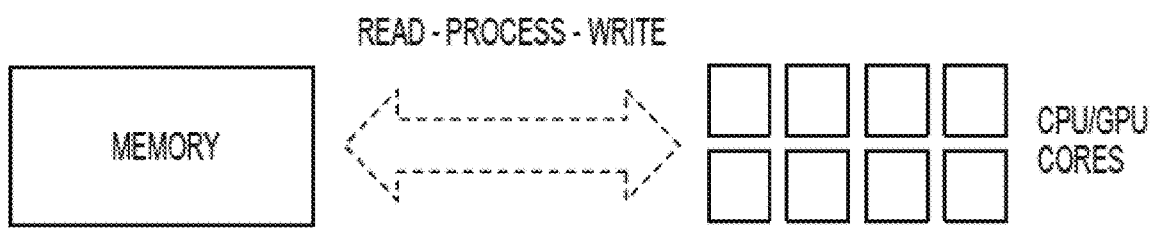
FIG. 4 depicts a simplified block diagram of a known weight update methodology.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

Turning now to an overview of the present invention, one or more embodiments are directed to a two-terminal programmable resistive crosspoint component referred to herein as a resistive processing unit (RPU), which provides local data storage functionality and local data processing functionality. In other words, when performing data processing, the value stored at each RPU is updated in parallel and locally, which eliminate the need to move relevant data in and out of a processor and a separate storage element. Additionally, the local data storage and local data processing provided by the described two-terminal RPUs accelerate the ANN's ability to learn and implement algorithms such as backpropagating online neural network training, matrix inversion, matrix decomposition and the like. Accordingly, implementing a machine learning ANN architecture having the described RPU enables the implementation of online machine learning capabilities that optimize the speed, efficiency and power consumption of learning. The described RPU and resulting ANN architecture improve overall ANN performance and enable a broader range of practical ANN applications.

The described RPU can be implemented as two-terminal resistive cross point devices, wherein their switching characteristics have a non-linearity that can be used for processing data. Thus, the described RPU can be implemented by any two-terminal device having an appropriate non-linear characteristic that can be used to perform calculations in an ANN. For example, the described RPU device can be implemented with resistive random access memory (RRAM), phase change memory (PCM), programmable metallization cell (PMC) memory, non-linear memristive systems, or any other two-terminal device that has non-linear resistive switching characteristics.

Prior to a more detailed description of the described RPU, an overview of systolic arrays, stochastic computing and linear and non-linear memristor devices, which are relevant to embodiments of the present invention, will now be provided. Systolic arrays are composed of parallel processing elements (PE) that attempt to accelerate the learning of certain highly used algorithms. Systolic arrays are often hard-wired for specific operations, such as "multiply and accumulate," to perform massively parallel integration, convolution, correlation, matrix multiplication or data sorting tasks. In a publication by C. Lehmann et al., titled "A Generic Systolic Array Building Block For Neural Networks with On-Chip Learning," IEEE Transactions On Neural Networks, Vol. 4, No. 3, May 1993, it is proposed to use systolic arrays as a building block for online learning neural networks, wherein each PE in the systolic array has local storage to store a single weight value and is capable of performing computations necessary for matrix multiplication and weight updates. The very-large-scale integration (VLSI) implementation of the PE described in the Lehmann article requires approximately 1800 transistors per PE, which increases power consumption and decreases scalability. It is therefore desirable to provide PEs that requires as few transistors per PE as possible.

Stochastic computing is a collection of techniques that represent continuous values by streams of random bits, wherein complex computations can be computed by simple bit-wise operations on the streams. Specifically, if there are two random and independent bit streams $S_1$, $S_2$ called stochastic numbers (i.e., a Bernoulli process), wherein the probability of a "one" in the first stream is P, and the probability of a "one" in the second stream is q, the logical AND of the two streams can be taken as shown in FIG. 5. The probability of a "one" in the output stream is pq. By observing enough output bits and measuring the frequency of "ones," it is possible to estimate pq to arbitrary accuracy. Because of the design simplicity of these so-called "multiply and accumulate" operations, which can be implemented with a few logic gates/transistors, stochastic computing is often used in the hardware design for neural networks. A publication by V. K. Chippa et al. titled "StoRM: A Stochastic Recognition and Mining Processor," Proceedings of the 2014 International Symposium On Low power Electronics and Design, shows an application of stochastic computing to two-dimensional (2D) systolic arrays that can be used as a hardware accelerator for neural network training algorithms.

However, in the Chippa et al. article, the necessary weights for the computations are supplied to the systolic array from external locations, and updates to the weights are not performed by the array. The Chippa et al. article only addresses the acceleration of vector-matrix multiplication or matrix-matrix multiplication operations that are heavily used during neural network training. However, systolic arrays without local storage cannot perform the weight updates in parallel because the weights are stored at an external memory location. Accelerating the weight updates, which is not described by the Chippa et al. article, is necessary in order to accelerate the overall learning algorithm.

The term "memristor" is used to describe a passive two-terminal electrical component, wherein the resistance value of the device depends on the history of the voltages that have previously been applied to the device. The operation of a memristor is governed by Equations [1] and [2] shown in FIG. 6, wherein i is the current passing through the device, v is the voltage applied to the device, g is the conductance value of the device (which is the inverse of the resistance), s is the internal state variable of the device that controls the conductance value and $f$ is the function that shows the time evolution of the internal state variable s. In a publication by Chua, L. O., titled "Resistance Switching Memories are Memristors," Applied Physics A (2011), 102 (4): 765-783, memristor functionality is proposed for the operation of resistive memory devices such as resistive random-access-memory (RRAM), phase change memory (PCM) and conductive-bridging random-access-memory (CBRAM). Because a memristor device remembers its history (i.e., the so-called "non-volatility property"), the Chua article proposes such devices as possible alternatives for non-volatile memory technologies.

A publication by D. Soudry et al., titled "Memristor-Based Multilayer Neural Networks With Online Gradient Descent Training," IEEE Transactions On Neural Networks and Learning Systems (2015), proposes the use of memristors for back-propagating neural network training hardware. However, the Soudry et al article assumes an ideal memristor operation, wherein the change in resistance is linear with respect to the voltage applied to the device. The Soudry et al. design assumed that the function $f(s,v)$ in Equation [2] of FIG. 6 is a simple function given by the relationship $f(s,v)=v$. The Soudry et al. article proposes an architecture that is similar to a 2D systolic array as described above, wherein each crosspoint is implemented with an ideal memristor and a pair of transistors. In the Soudry et al. article, the memristor is in effect used to store the weight value, and the pair of transistors is used to compute a local multiplication operation that is needed for the weight updates, wherein the result of the weight update modifies the memristor's conduction state. The Soudry et al. article describes, in effect, a four terminal device composed of a memristor and two transistors, which are used to make a 2D array of the 4 terminal devices in order to implement the back-propagation training of the neural network hardware.

Turning now to a more detailed description of the present invention, one or more embodiments are directed to two-terminal RPUs, which provide local data storage functionality and local data processing functionality without the necessity of extra circuit elements such as transistors and off-chip storage and/or processing components. The described RPU can be implemented as any device that has a non-linear switching characteristic, including but not limited to RRAM, PCM, CBRAM, non-linear memristive systems, and the like.

When implementing the described RPU device as a memristive system, it is important that the memristor is non-ideal with a non-linear switching characteristic. In an ideal memristor, the change in resistance is linearly proportional to the voltage applied to the ideal memristor device. Accordingly, as soon as an ideal memristor device experiences any voltage its resistance state changes. However, for described RPU devices implemented as non-ideal, non-linear memristive systems, there is a well-defined "SET" voltage, $V_{SET}$, (which is characteristics of the device), and the memristive RPU device would need to experience a voltage $V > V_{SET}$ in order to change its internal resistance state. For such devices, a half bias application of a voltage $V=0.5V_{SET}$ does not cause any change in the internal resistance state.

To further illustrate the difference between an ideal memristor and a non-ideal, non-linear memristor that can be used to implement the described RPU, FIG. 7 is a graph illustrating a comparison between the voltage switching behaviors of an ideal memristor and an RPU in accordance with embodiments of the present invention. The vertical axis represents device state change at a particular voltage, and the horizontal axis represents the voltage applied. In an ideal memristor operation, a change in resistance is linearly proportional to the voltage applied to the device. Thus, as soon as the memristor sees any voltage, its resistance state changed. This is shown by curve 702, which shows that the change in state is dramatic even at low voltages.

For non-linear RPU devices as shown by the curve 704, there is a well-defined set voltage, $V_{SET}$, that the device needs to experience in order to change its internal resistance state. A bias voltage of $0.5V_{SET}$ will not change the internal resistance state. In embodiments of the present invention, this non-linear characteristic of the RPU device is exploited to perform multiplication locally. Assuming $f_1$ is small, the device will not change its internal state when only $0.5V_{SET}$ is applied. Notably, FIG. 7 illustrates positive voltages and positive changes to the resistive state of the RPU device, however, a similar relationship between negative voltages and negative resistance changes also exists.

Figure 8:
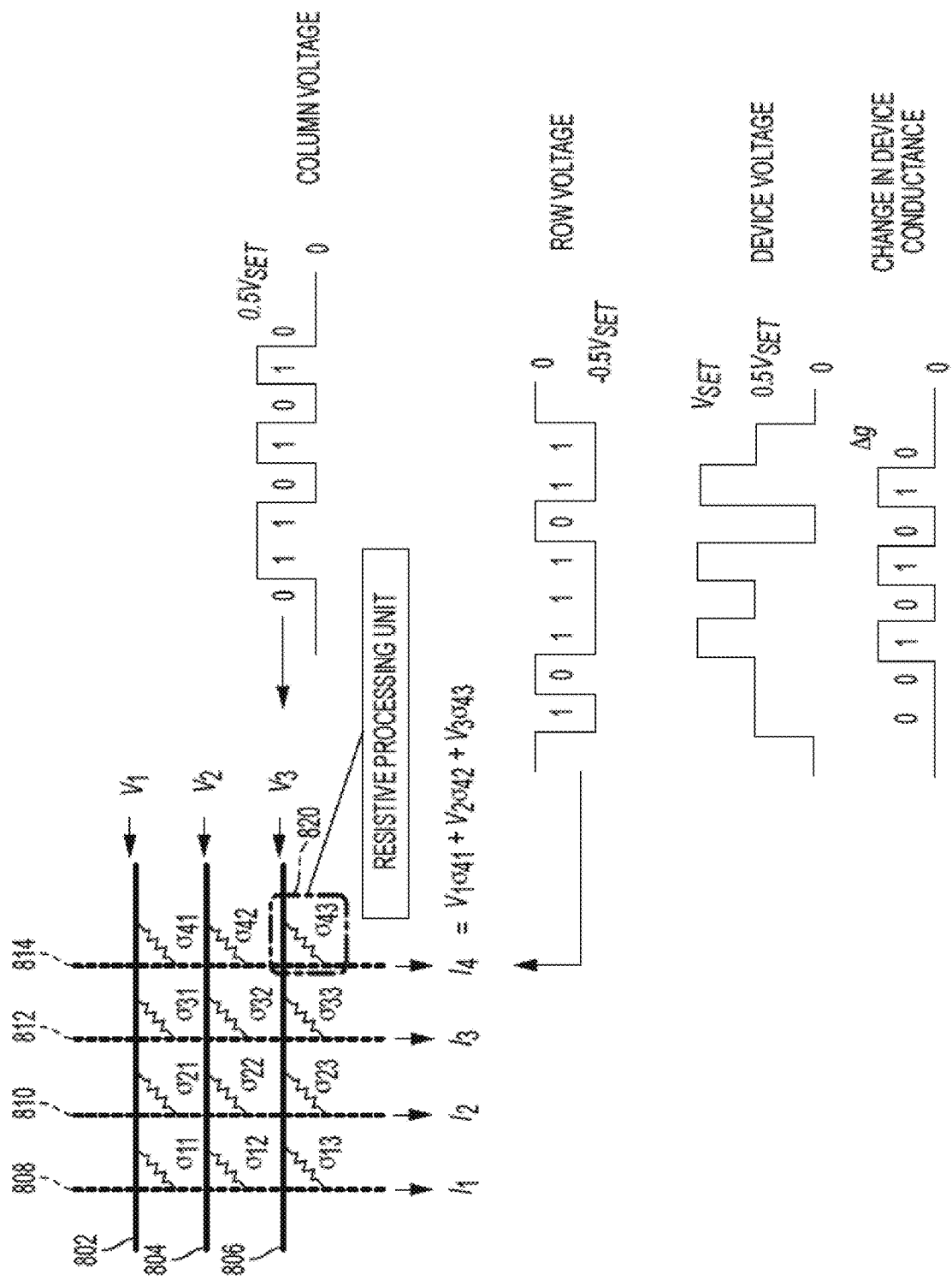
FIG. 8 depicts a cross bar array of two-terminal, non-linear RPU devices according to embodiments of the present invention, along with voltage sequences illustrating the operation of the RPU.

FIG. 8 is a diagram of a two-dimensional (2D) crossbar array 800 that performs forward matrix multiplication, backward matrix multiplication and weight updates according to embodiments of the present invention. Crossbar array 800 is formed from a set of conductive row wires 802, 804, 806 and a set of conductive column wires 808, 810, 812, 814 that intersect the set of conductive row wires 802, 804, 806. The intersections between the set of row wires and the set of column wires are separated by RPUs, which are shown in FIG. 8 as resistive elements each having its own adjustable/updateable resistive weight, depicted as $\sigma_{11}$, $\sigma_{21}$, $\sigma_{31}$, $\sigma_{41}$, $\sigma_{12}$, $\sigma_{22}$, $\sigma_{32}$, $\sigma_{42}$, $\sigma_{13}$, $\sigma_{23}$, $\sigma_{33}$ and $\sigma_{43}$, respectively. For ease of illustration, only one RPU 820 is labeled with a reference number in FIG. 8. In forward matrix multiplication, the conduction state (i.e., the stored weights) of the RPU can be read by applying a voltage across the RPU and measuring the current that passes through the RPU.

Input voltages $V_1$, $V_2$, $V_3$ are applied to row wires 802, 804, 806, respectively. Each column wire 808, 810, 812, 814 sums the currents $I_1$, $I_2$, $I_3$, $I_4$ generated by each RPU along the particular column wire. For example, as shown in FIG. 8, the current $I_4$ generated by column wire 814 is according to the equation $I_4=V_1\sigma_{41}+V_2\sigma_{42}+V_3\sigma_{43}$. Thus, array 800 computes the forward matrix multiplication by multiplying the values stored in the RPUs by the row wire inputs, which are defined by voltages $V_1$, $V_2$, $V_3$. The backward matrix multiplication is very similar. In backward matrix multiplication, voltages are applied at column wires 808, 810, 812, 814 then read from row wires 802, 804, 806. For weight updates, which are described in greater detail below, voltages are applied to column wires and row wires at the same time, and the conductance values stored in the relevant RPU devices all update in parallel. Accordingly, the multiplication and addition operations required to perform weight updates are performed locally at each RPU 820 of array 800 using the RPU device itself plus the relevant row or column wire of array 800. Thus, in accordance with embodiments of the present invention, no read-update-write cycles (shown in FIG. 4) are required in array 800.

Continuing with the diagram of FIG. 8, in accordance with one or more embodiments, the operation of a positive weight update methodology for RPU 820 and its corresponding weight $\sigma_{33}$ at the intersection of conductive row wire 806 and conductive column wire 812 will now be provided. The non-linear characteristics of RPU 820 are used to perform multiplication operations locally at RPU 820 using stochastic computing as described below. More specifically, the described methodology uses the non-linear switching characteristics of RPU 820 and stochastic bit streams 830, 832 to perform multiplication operations and the necessary weight updates locally at RPU 820 without the necessity of other circuit elements. Update generator circuitry (not shown) is provided at the periphery of crossbar array 800 and used as a peripheral "translator" in order to generate necessary voltage pulses in the form of stochastic bit streams (e.g., 830, 832) that would be applied to all RPUs of 2D crossbar array 800 in parallel.

Referring briefly to the diagram of FIG. 7, it is assumed that $f_1$ for RPU 820 shown in FIG. 8 is very small (e.g., $f_1=0$) which means that RPU 820 does not change its internal state when only $0.5V_{SET}$ is applied to it. A row voltage sequence or bit stream 830, which is applied to row wire 806, is shown as a sequence of voltage pulses representing weight updates having a voltage of zero or a voltage of $+0.5V_{SET}$. A column voltage sequence or bit stream 832, which is applied to column wire 814, is shown as a sequence of voltage pulses also representing weight updates having either a voltage of zero or a voltage of $-0.5V_{SET}$. In example of FIG. 8, 4/8 is encoded by row voltage sequence 830, and 6/8 is encoded by column voltage sequence 832. The example voltage sequences 830, 832 represent a positive resistance change phase of the weight update. After the positive weight updates are performed, a separate set of sequences with the polarity of the respective voltages reversed can be used to update weights in a negative direction for those weights that need such correction.

Voltage sequence 834 is the voltages applied to RPU 820 resulting from the difference between row voltage sequence 830 and column voltage sequence 832. Voltage sequence 834 will have 3 voltage steps at 0V, $0.5V_{SET}$ and $V_{SET}$. However, because the resistance $\sigma_{43}$ of RPU 820 only changes for device voltages reaching $V_{SET}$, a single pulse either send through a column wire or a row wire is not enough to change the resistance state of RPU 820. When a column wire sends a voltage at $0.5V_{SET}$, and a row wire sends a voltage at $-0.5V_{SET}$, the resulting $V_{SET}$ pulse applied to the relevant RPU will cause an incremental change in the resistance of the device. Accordingly, the voltage pulses applied to RPU 820 utilize the non-linear switching characteristic of RPU 820 in order to perform a bit wise stochastic AND operation (e.g., as shown in FIG. 5) locally at RPU 820. Hence, the resulting change in the stored weight (e.g., $\sigma_{43}$) of the RPU is proportional to the product of the two numbers (4/8*6/8=3/8) "translated" by update generator circuitry, which is peripheral to crossbar array 800.

Figure 9B:
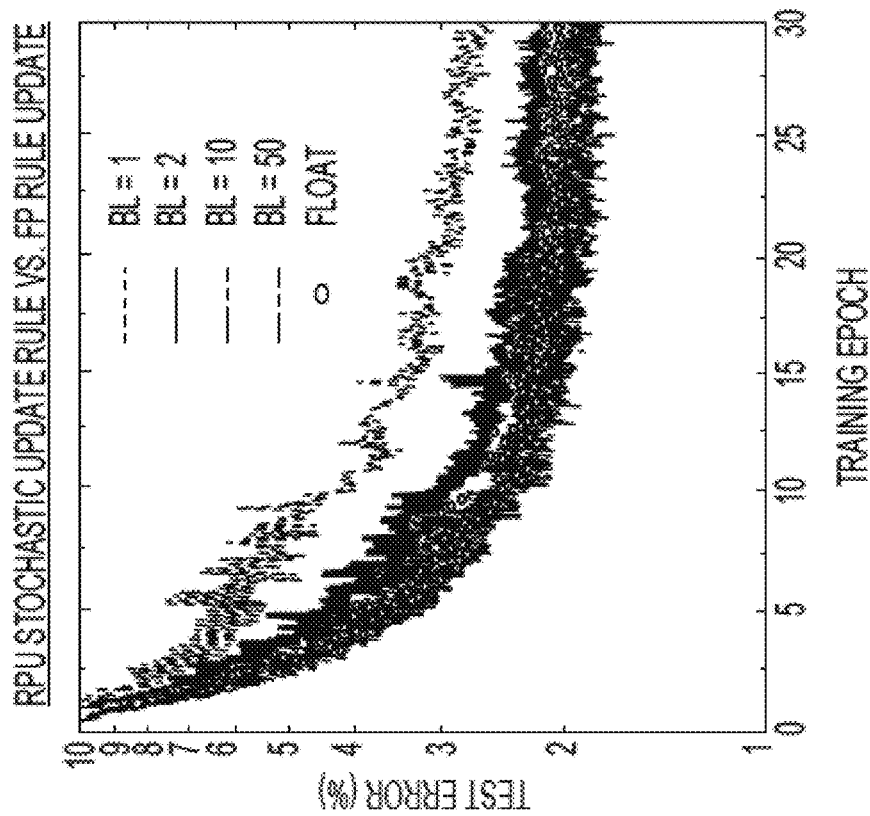
FIG. 9B depicts a graph illustrating classification accuracies of an ANN trained on an MNIST dataset using different weight update accuracies that can be achieved for different bit lengths (BLs) of the stochastic weight update methodology according to embodiments of the present invention.
Figure 9A:
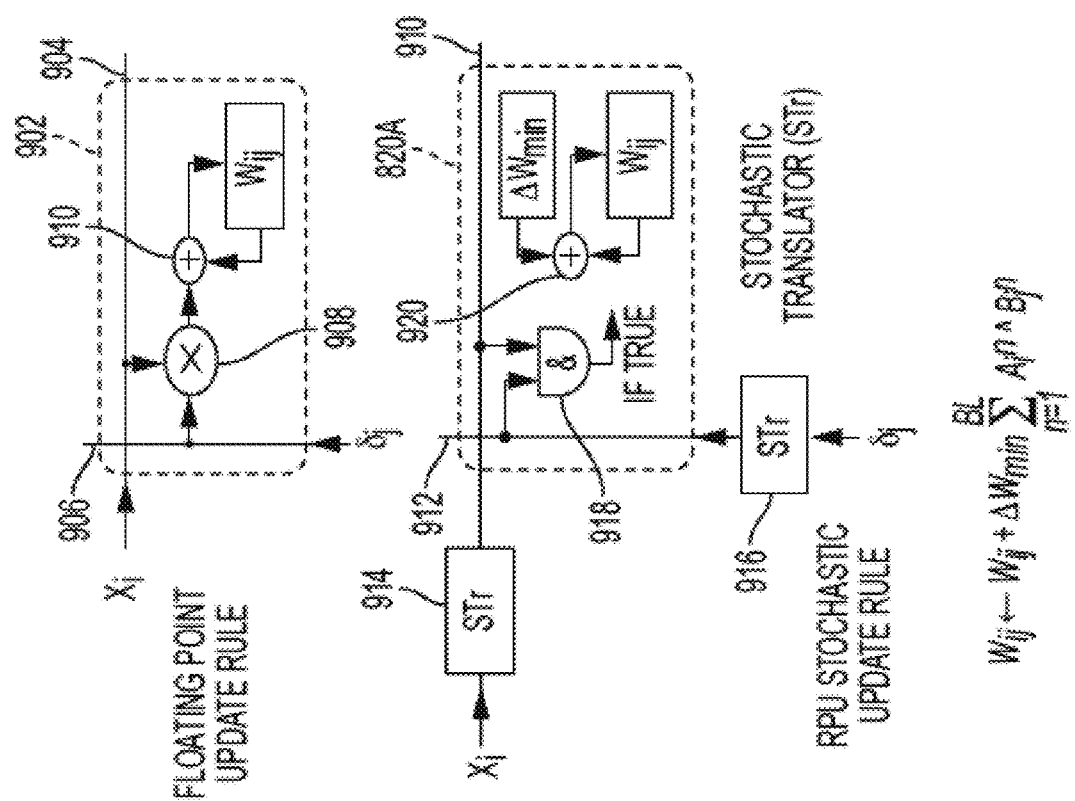
FIG. 9A depicts a simplified block diagram of a stochastic weight update methodology according to one or more embodiments of the present invention.

FIGS. 9A and 9B illustrate a comparison of the classification error rate performance of an exemplary known floating point (FP) weight update rule against the described stochastic-RPU (SRPU) update rule. The FP weight update rule requires calculating a vector-vector outer product which is equivalent to a multiplication operation and an incremental weight update to be performed locally at each cross-point as shown in FIG. 9A. The FP weight update rule can be expresses as $w_{ij} \leftarrow w_{ij}+\eta x_i \delta_j$, wherein $w_{ij}$ represents the weight value for the $i^{th}$ row and the $j^{th}$ column, $x_i$ is the activity at the input neuron, $\delta j$ is the error computed by the output neuron and $\eta$ is the global learning rate.

As shown in FIG. 9A, the FP weight update rule uses a FP crosspoint device 902 located at a crosspoint between a row wire 904 and a column wire 906 of a crossbar array (not shown). FP crosspoint device 902 includes processing components (not shown) having more than two terminals, wherein the processing components receive update data as FP numbers via signals $x_i$ and $\delta_j$ applied at row wire 904 and column wire 906, respectively. FP crosspoint device 902 calculates the weight update, $W_{ij}$, using multiplication operations 908 and addition operations 910, then stores the weight update, $W_{ij}$. The FP weight update rule provides accuracy but requires either a read-write-process update operation (e.g., shown in FIG. 4) or relatively complex and power consuming local processing components having more than two terminals.

An embodiment of the described SRPU weight update rule is shown in Equation 3 of FIG. 9A, where BL is length of the bit stream that is used during the update cycle, $\Delta w_{min}$ is the effective change in the weight value due to a single coincidence event, $A_i^n$ and $B_j^n$ are random variables that are characterized by the Bernoulli process, and their success rates are controlled by xi and δj respectively and superscript n represents pulse index. The SRPU weight update rule shown in FIG. 9A enables all of the RPU devices in a single array to work in parallel and perform the local multiplication operation by simply replying on the statistics of coincidence events. However, because of the stochastic nature of the updates, the results would always be probabilistic and the variance to mean ratio of the multiplication operation would be proportional to an inverse of the square root of BL.

As shown in FIG. 9A, the SRPU weight update rule uses a RPU crosspoint device 820A, which operates in substantially the same manner as RPU 820 shown in FIG. 8 and described in detail above. RPU 820A is located at a crosspoint between a row wire 910 and a column wire 912 of a crossbar array (not shown). RPU 820A includes processing components (shown at 820 in FIG. 8) having two terminals, wherein the processing components receive update data as stochastic numbers via stochastic signals generated by stochastic translators 914, 916 that receive input data $x_i$ and $\delta_j$ and apply stochastic voltage sequences to row wire 912 and column wire 914, respectively. RPU 820A calculates the new value of $W_{ij}$, using the stochastic bit streams, the non-linear characteristics of the RPU 820A, an AND operation 918 and an addition operation 920. More specifically, RPU 820A causes an incremental conductance change that is equivalent to a weight change, $\Delta w_{min}$, for every coincidence event and adds $\Delta w_{min}$ to the stored weight value to arrive at the updated weight value, $W_{ij}$.

The graph of FIG. 9B illustrates the results of a comparison between the classification error rates of the SRPU weight update rule and classification error rates of the FP weight update rule by analyzing the problem of training deep neural network using the backpropagation algorithm with a probabilistic update rule as defined in the above-described SRPU weight update rule and compare the results against a baseline using the above-described FP weight update rule. The digit classification task is performed on the MNIST dataset. The deep neural network was composed of fully connected layers, wherein each layer included 784, 256, 128 and 10 neurons respectively from input to output. No preprocessing of the data was performed, and the raw pixel values were given as an input. Sigmoid neurons were used at the hidden layers, and softmax neurons were used at the output. A cross-entropy objective function was used. For the baseline FP weight update, the training was performed using floating point arithmetic with a batch size of unity and learning rate of 0.01, 0.005 and 0.0025 for epochs from 0-10, 11-20 and 21-30, respectively. The baseline reached classification accuracies of about 2.0% on the test data at the end of 30 epochs as illustrated by the open circles on the graph shown in FIG. 9A.

The learning rate is an important hyper parameter that must be adjusted to some degree in order to achieve acceptable convergence properties of the neural network. Therefore, for the described SRPU weight update, a learning rate is used that is on average identical to the values used for the FP weight update baseline. The simulations illustrated in FIG. 9B assumed that the $x_i$ and $\delta_j$ are directly translated to stochastic streams without any scaling, and that $P(A_i^n=success)=x_i$ and $P(B_j^n=success)=\delta_j$. Therefore the average change in the weight value can be written as $\mathbb{E}(\Delta w_{ij})=BL \times \Delta w_{min} \times x_i \delta_j$. In the first set of simulations, BL was fixed, and $\Delta w_{min}=\eta/BL$ in order match the learning rate used for the FP weight update baseline. Training was performed using different BL to observe the tolerance of the algorithm to the SRPU weight updates. As shown in the graph of FIG. 9B, the SRPU weight update rule is very robust against BL and indeed for BL≥10 the accuracy of the SRPU weight update rule becomes indistinguishable from the baseline FP weight update rule. Thus, as demonstrated in FIG. 9B, the SRPU weight update can perform as well as the FP weight update and can be implemented by RPU devices operating in parallel independent of the array size by simply using a BL≥10 cycles.

Figure 10A:
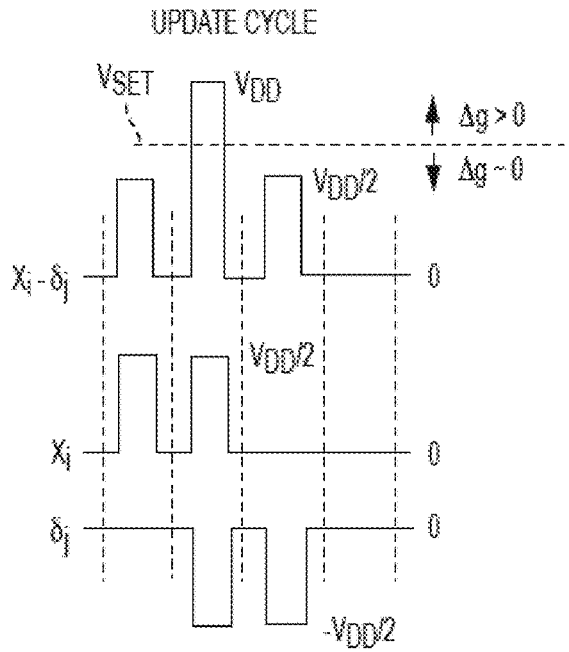
FIGS. 10A-D depict simplified diagrams and graphs illustrating additional details for implementing stochastic weight updates using a two-terminal, non-linear RPU according to one or more embodiments.
Figure 10B:
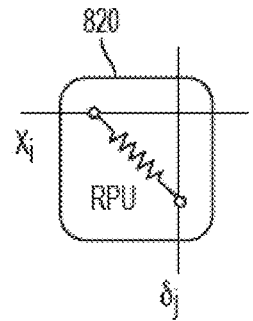
Figure 10C:
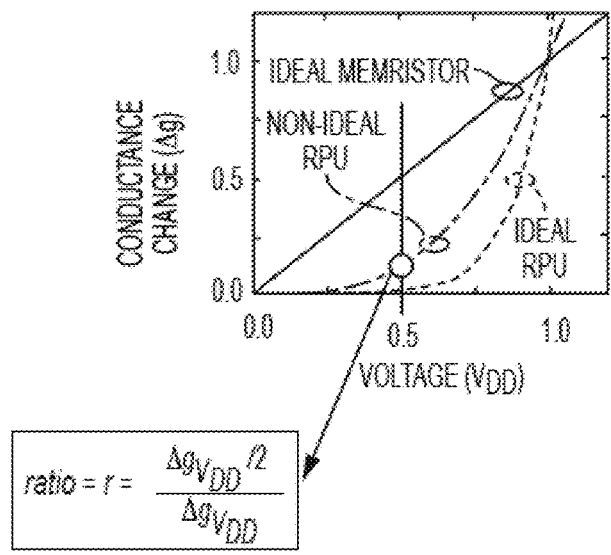
Figure 10D:
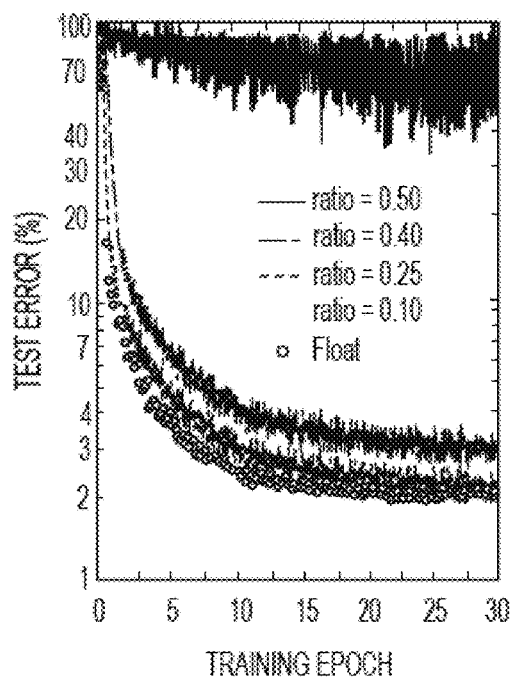

FIGS. 10A-D depict simplified diagrams and graphs illustrating how a measure of RPU linearity (r) can be calculated for the described stochastic weight updates using a two-terminal, non-linear RPU according to one or more embodiments. FIG. 10A depicts the stochastic voltage sequences, which have previously described, and FIG. 10B depicts RPU 820, which receives and responds to the stochastic voltage sequences. FIG. 10A, also depicts, Δg, which is the change in the RPU's conduction value in response to the voltage sequences applied at $x_i$ and $\delta_j$. More specifically, Δg is the response of RPU 820 to a voltage pulse that reaches $V_{DD}$. Accordingly, a device linearity ratio, r, can be determined according to the equation shown in FIG. 10A. FIG. 10C is a switching diagram, similar to FIG. 7, which plots Δg vs. VDD, compares the response of an ideal memristor against a non-ideal RPU and an ideal RPU. FIG. 10C depicts the classification errors for different non-linearity ratios. FIGS. 10C and 10D demonstrate that RPU 820 can be designed and operated at different levels of non-linearity by changing the relevant parameters, and that even if RPU 820 is non-ideal, it can still be operated at acceptable classification error rates.

Figure 11B:
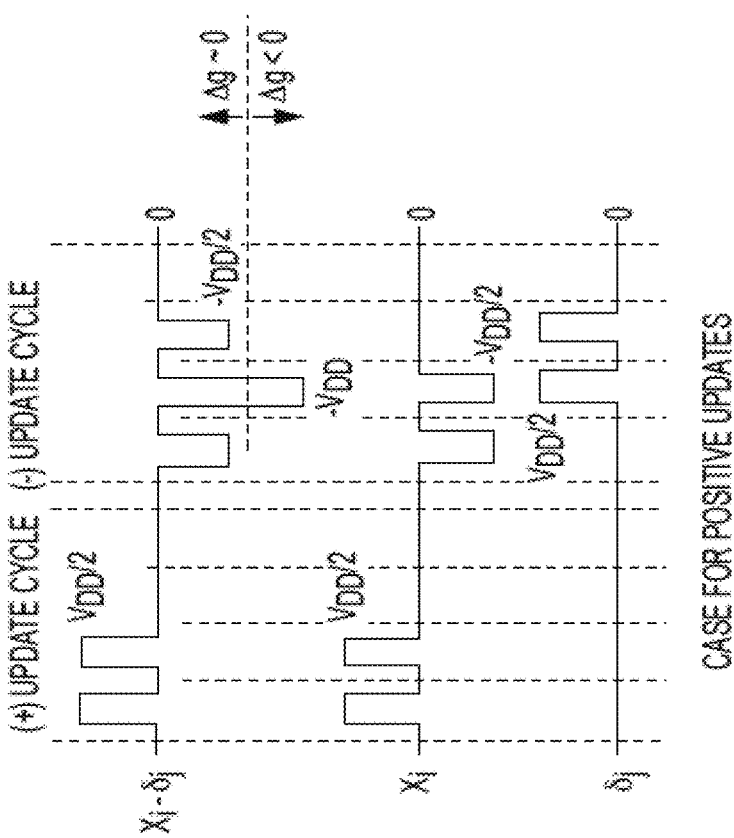
FIGS. 11A-11B depict voltage sequences illustrating examples of positive and negative stochastic weight update cycles according to one or more embodiments.
Figure 11A:
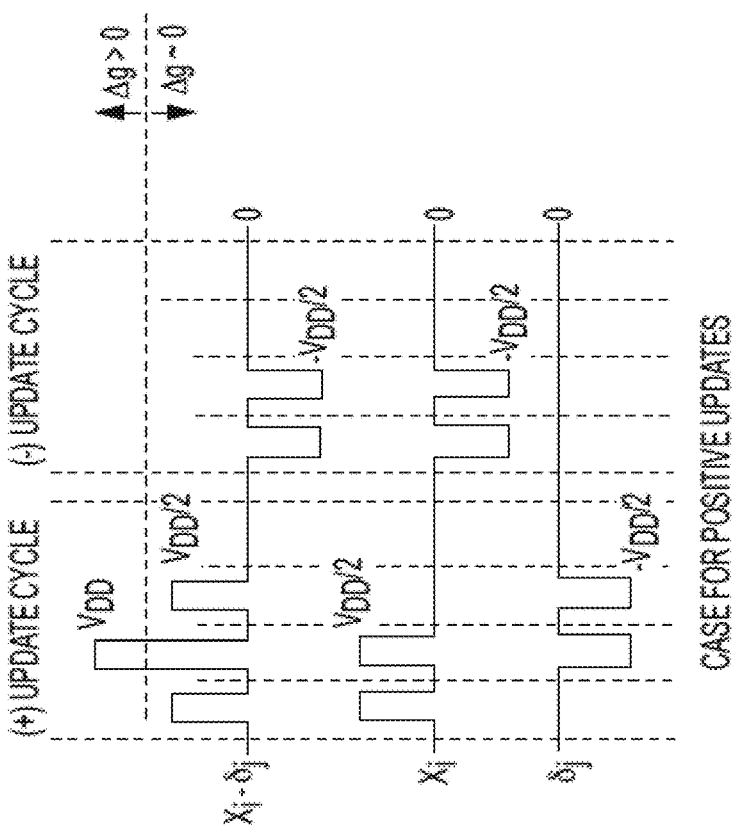

FIG. 10A depicts positive update cycle pulses. FIGS. 11A and 11B depict that, by changing the polarity of pulses, both positive and negative update cycles can be implemented.

Figure 12:
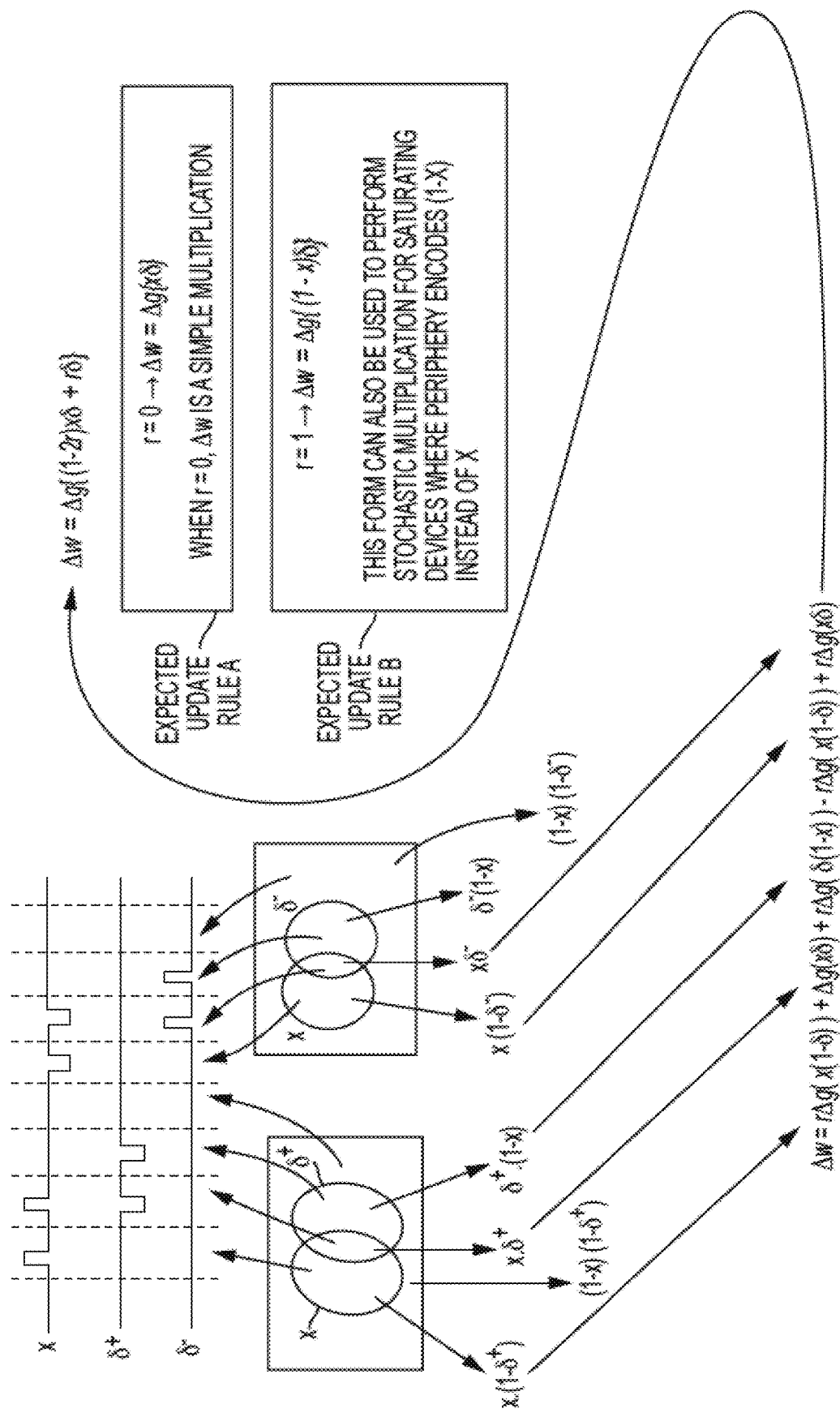
FIG. 12 depicts simplified diagrams and graphs illustrating additional details for implementing stochastic weight updates using a two-terminal, non-linear RPU according to one or more embodiments.

FIG. 12 depicts simplified diagrams and graphs illustrating additional details for implementing stochastic weight updates using a two-terminal, non-linear RPU according to one or more embodiments. FIG. 12 demonstrates on average how much weight change Δw will be obtained by the positive and negative pulsing scheme shown in FIGS. 11A and 11B. Accordingly, $x_i$ and $\sigma_j$ populate both the positive update cycle and the negative update cycle based on the respective pulse sign. This guarantees that when there is overlap on the RPU, the voltage on the RPU is capable of passing the threshold in either the positive direction or the negative direction based on the sign of Δg. The diagrams shown below the pulse sequences are graphical representations of how the pulses x, $\delta^+$ and $\delta^-$ in the pulse sequences interact. By summing the expected values, as shown by the equation for Δw based on the contributions from the half pulses and full pulses, two forms of the final expected update rule Δw can be derived.

Figure 13B:
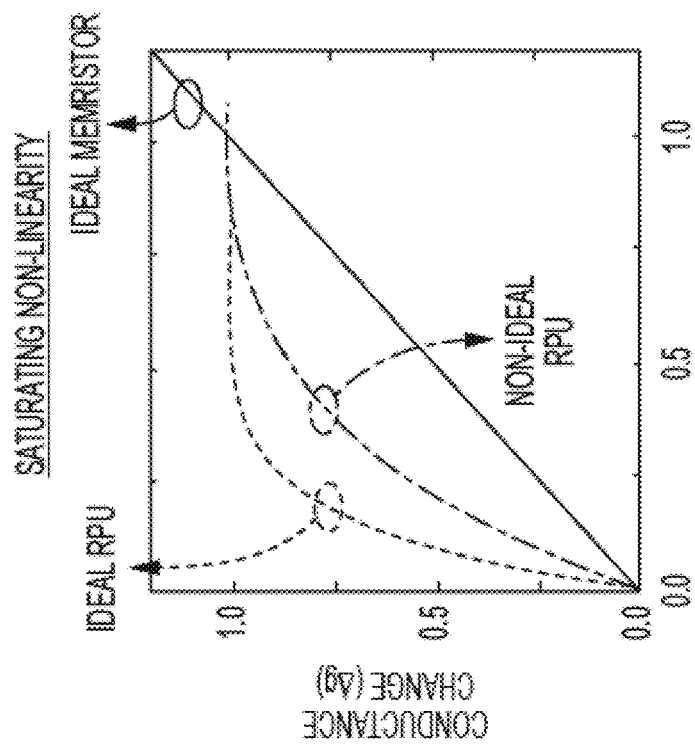
FIG. 13A-B depict graphical comparisons between the linear switching characteristic of a known two-terminal memristor and the non-linear switching characteristic of a two-terminal RPU according to embodiments of the present invention.
Figure 13A:
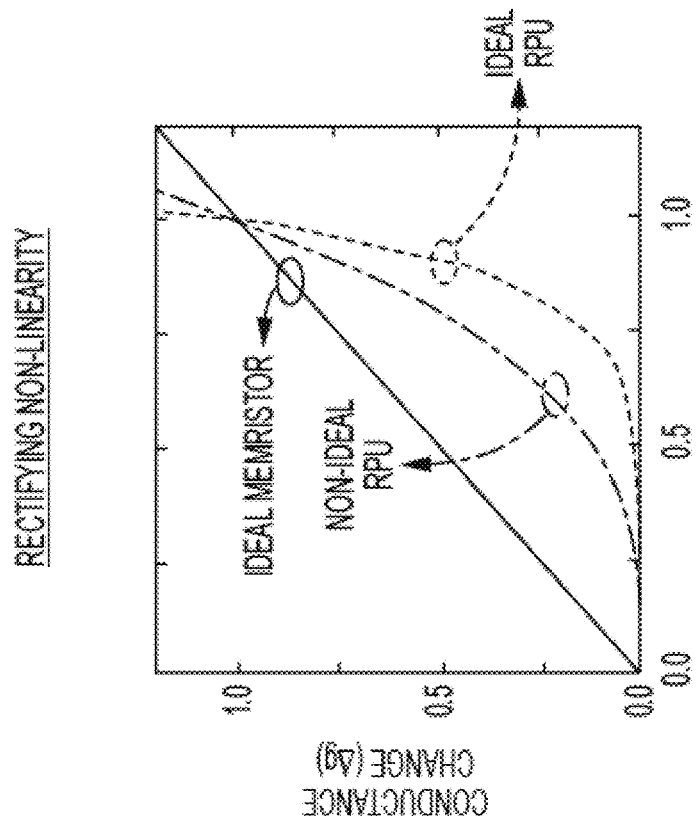

FIGS. 13A and 13B depict a side by side comparison a rectifying non-linearity (also shown in FIG. 10C) of the described RPU and a saturating non-linearity of the described RPU. For the non-saturating linearity, it will be necessary to, instead of encoding x into the RPU, encode 1-x in order for the saturating non-linear RPU to perform the necessary multiplication.

FIGS. 14 and 15 depicts graphs, diagrams and equations illustrating an expected weight update rule Δw when a height-modulation pulsing scheme is used, along with a two-terminal RPU having an exponential non-linearity. In this example, the stochastic encoding is replaced by voltage height modulation. As shown in FIG. 15, a Taylor expansion can be used to simplify the expected weight update rule to Δw=xδ. Accordingly, the derivation shown in FIGS. 14 and 15 demonstrates that the higher order terms shown in FIGS. 14 and 15 do not matter, and the exponential, height modulated RPU works as well as the previously described embodiments, as shown by the graph shown at the lower right of FIG. 15.

Figure 16:
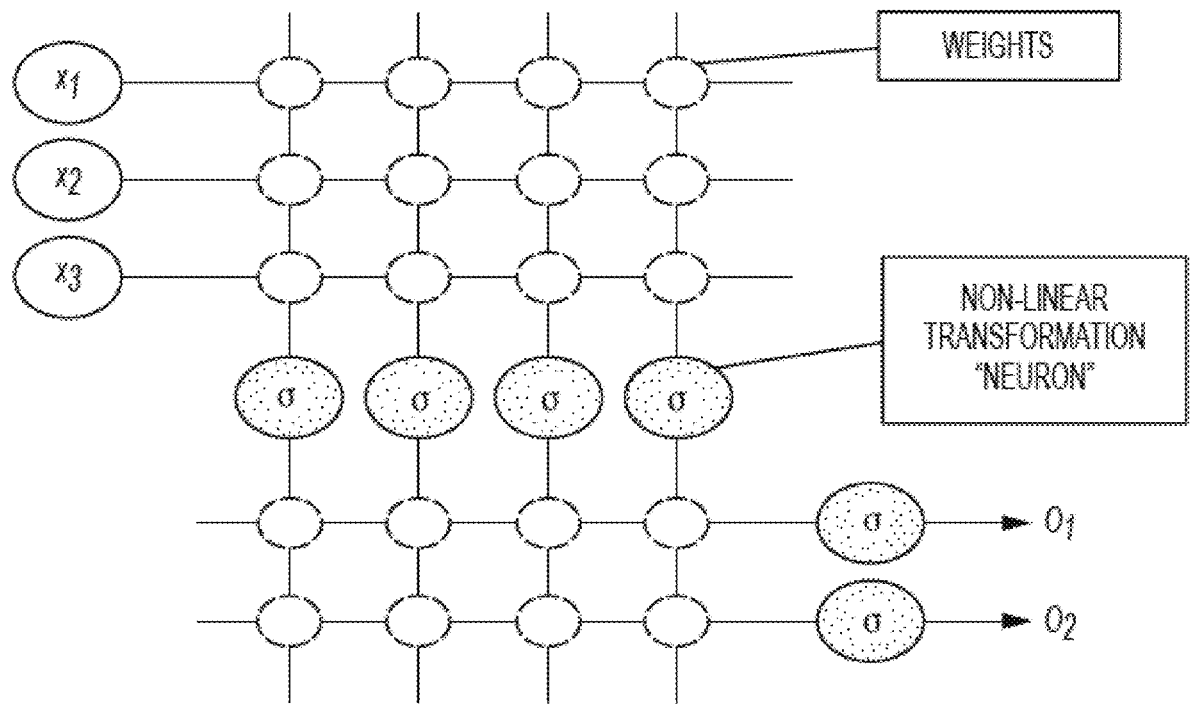
FIG. 16 depicts aspects of developing, training and using an ANN architecture that includes crossbar arrays of two-terminal, non-liner RPUs according to embodiments of the present invention.
Figure 17:
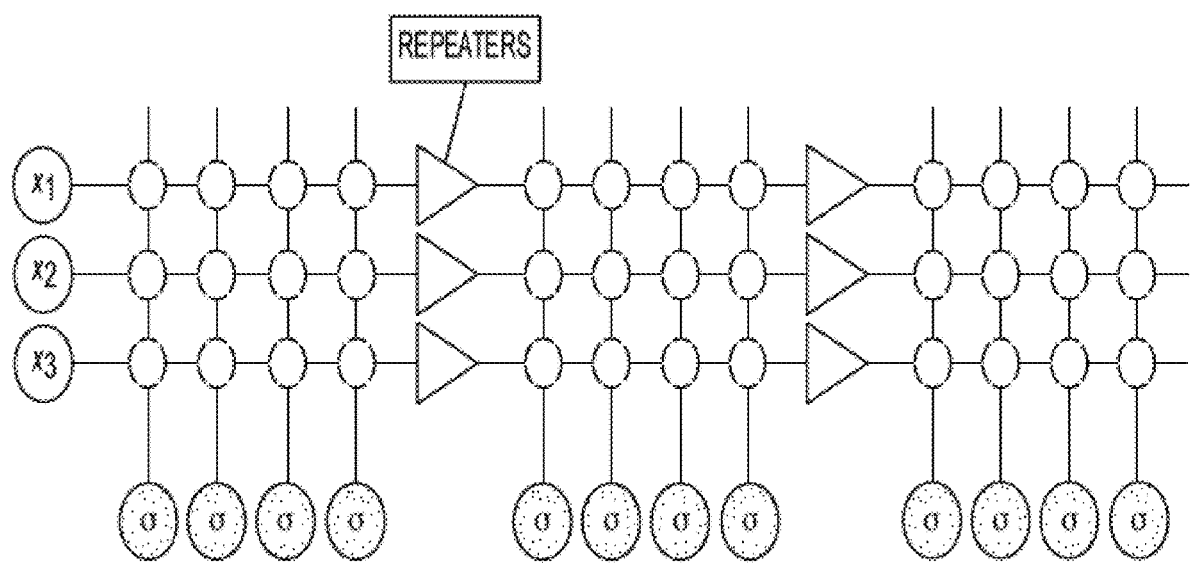
FIG. 17 depicts additional aspects of developing, training and using an ANN architecture that includes crossbar arrays of two-terminal, non-liner RPUs according to embodiments of the present invention.
Figure 18:
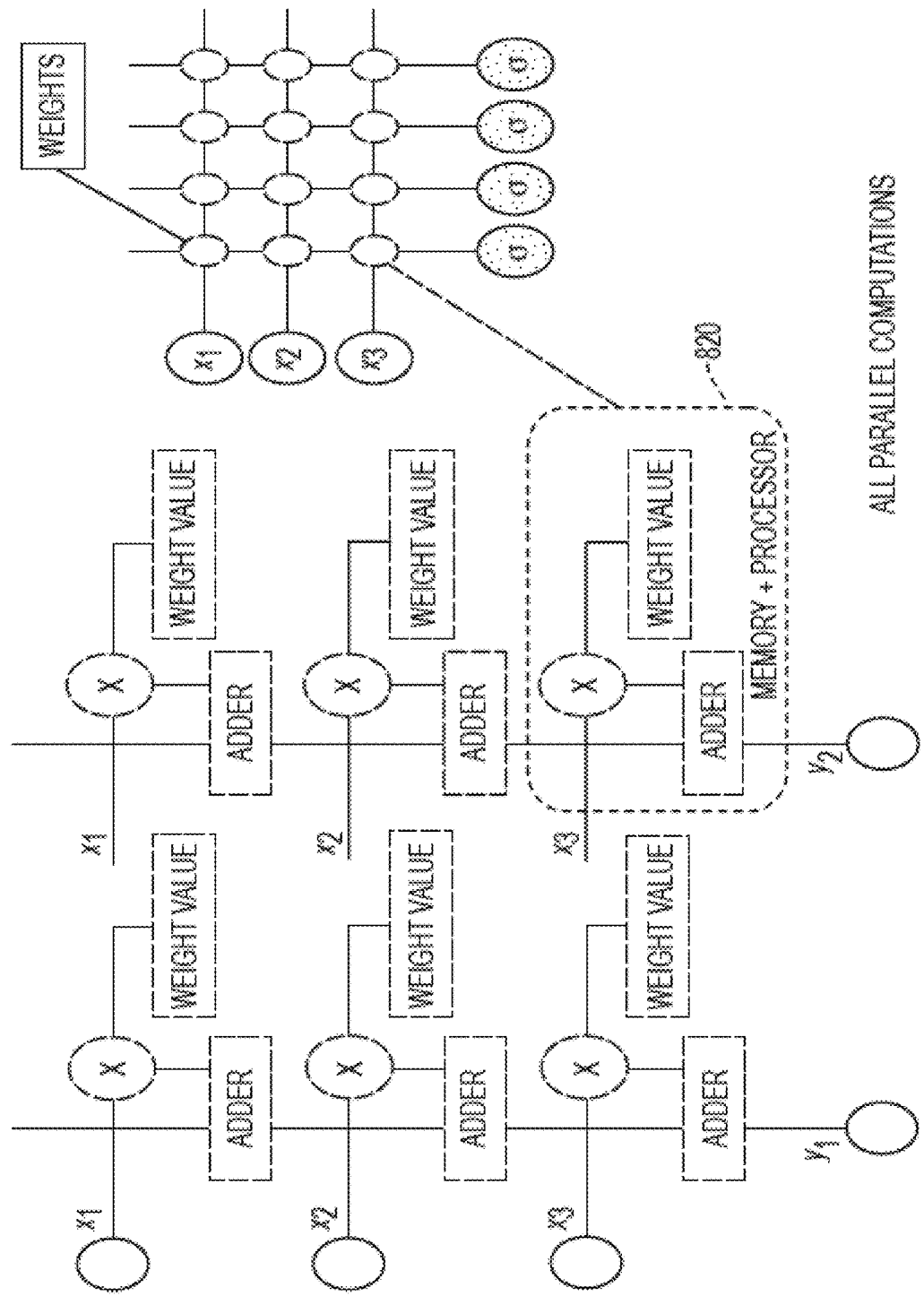
FIG. 18 depicts additional aspects of developing, training and using an ANN architecture that includes crossbar arrays of two-terminal, non-liner RPUs according to embodiments of the present invention.

FIGS. 16-18 depict aspects of developing, training and using an ANN architecture that includes crossbar arrays of two-terminal, non-liner RPUs according to embodiments of the present invention. FIG. 16 depicts a starting point for designing a neural network. In effect, FIG. 16 is an alternative representation of the neural network diagram shown in FIG. 3. As shown in FIG. 16, the input neurons, which are $x_1$, $x_2$ and $x_3$ are connected to hidden neurons, which are shown by sigma ($\sigma$). Weights, which represent a strength of connection, are applied at the connections between the input neurons/nodes and the hidden neurons/nodes, as well as between the hidden neurons/nodes and the output neurons/nodes. The weights are in the form of a matrix. As data moves forward through the network, vector matrix multiplications are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Basically, each weight will be updated proportionally to the input to that weight as defined by the input neuron/node and the error computed by the neuron/node to which it is connected.

FIG. 17 shows how the network can be divided into building blocks that are connected by repeaters, thus allowing the neural network to be extended to an arbitrary size. Because the network uses the described RPUs, the information flow is local, which facilitates repeating the building blocks.

FIG. 18 shows the network building block in the forward pass formed from RPU 820 (shown in FIG. 8). RPU 820 can be provided with any of the non-linearity profiles shown in FIG. 7, 10C, 13A, 13B or 14.

Figure 19:
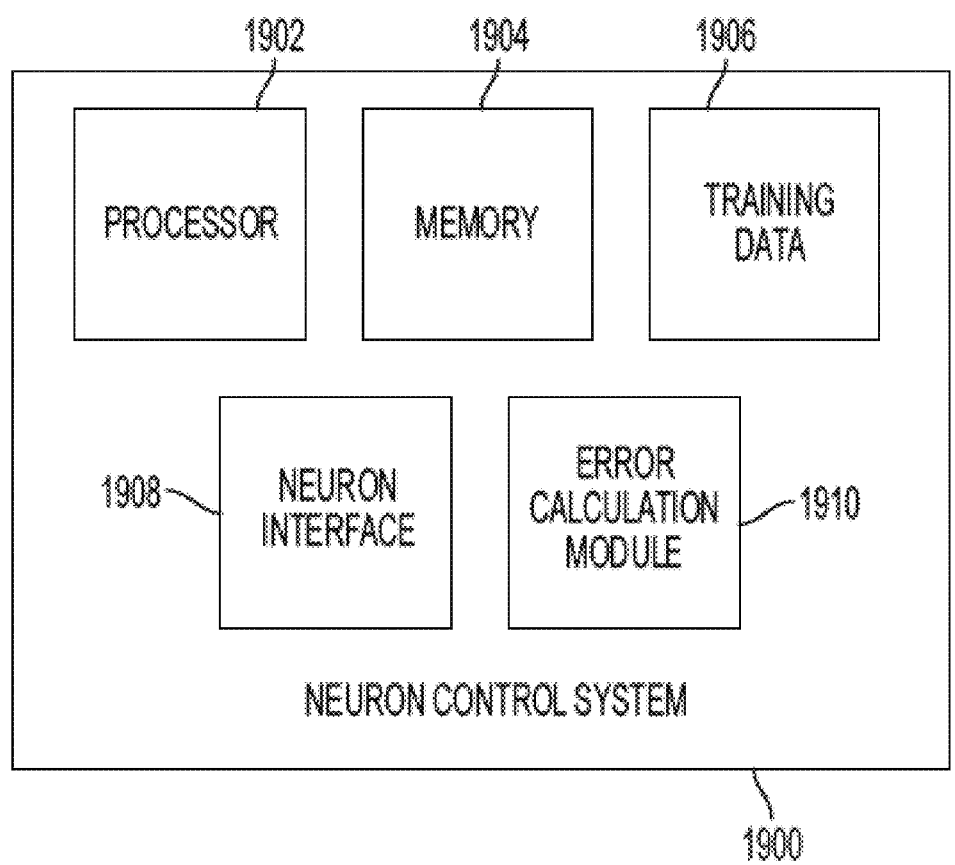
FIG. 19 depicts a block diagram of a node control system in accordance with one or more embodiments of the present invention.

Referring now to FIG. 19, a node/neuron control system 1900 is shown. The neuron control system 1900 includes a hardware processor 1902 and memory 1904. Training data 1906 for an ANN is stored in the memory 1906 and is used to train weights of the ANN. A neuron interface 1908 controls neurons on the ANN, determining whether the neurons are in feed forward mode, back propagation mode, or weight update mode. The neuron interface 1908 furthermore provides inputs to input neurons and receives the output from output neurons. An error calculation module 1910 compares the outputs from the neurons to training data 1906 to determine an error signal. Neuron interface 1908 applies the error signal to the output neurons during a back propagation mode and subsequently triggers a weight update mode to train the weights of the ANN accordingly.

Figure 20:
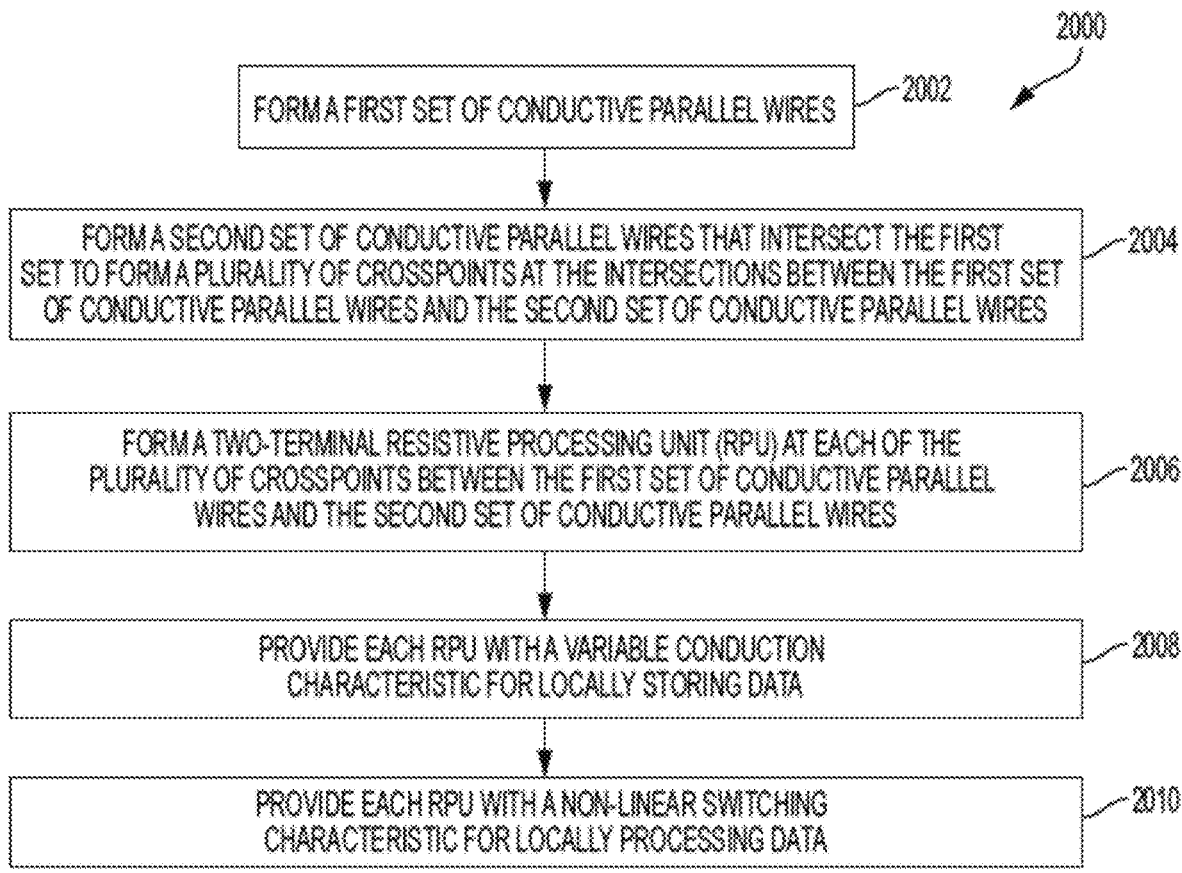
FIG. 20 depicts a flow diagram illustrating a methodology according to one or more embodiments of the present invention.

FIG. 20 depicts a flow diagram illustrating a methodology 2000 according to one or more embodiments. Methodology 2000 begins at block 2002 by forming a first set of conductive parallel wires. Block 2004 forms a second set of conductive parallel wires that intersect the first set to form a plurality of crosspoints at the intersections between the first set of conductive parallel wires and the second set of conductive parallel wires. Block 2006 forms a two-terminal RPU at each of the plurality of crosspoints between the first set of conductive parallel wires and the second set of conductive parallel wires. Block 2008 provides each RPU with a variable conduction characteristic for locally storing data, and block 2010 provides each RPU with a non-linear switching characteristic for locally processing data.

Figure 21:
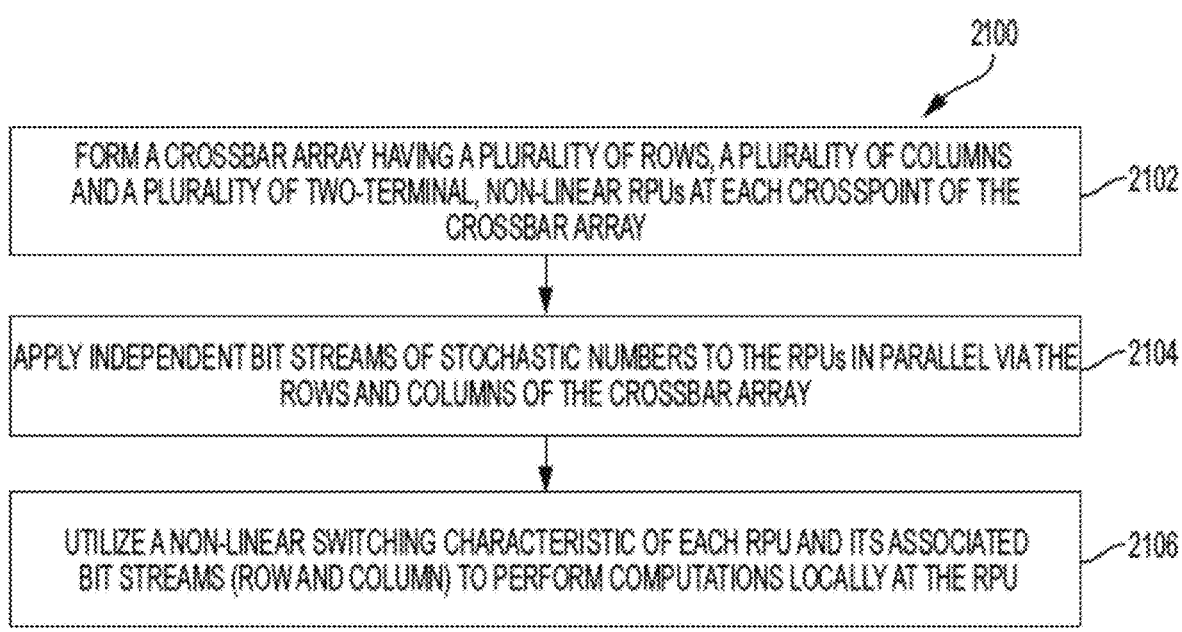
FIG. 21 depicts a flow diagram illustrating another methodology according to one or more embodiments of the present invention.

FIG. 21 depicts another flow diagram illustrating a methodology 2100 according to one or more embodiments. Methodology 2100 begins at block 2102 by forming a crossbar array having a plurality of rows, a plurality of columns and a plurality of two-terminal, non-linear RPUs at each crosspoint of the crossbar array. Block 2104 applies independent bit streams of stochastic numbers to the RPUs in parallel via the rows and columns of the crossbar array. Block 2106 utilizes a non-linear switching characteristic of each RPU and its associated bit streams (row and column) to perform computations locally at the RPU.

Referring back to FIG. 10A, $\Delta g$ is the change in the RPU's conduction value in response to the voltage sequences applied at $x_i$ and $\sigma_j$. Thus, $\Delta g$ is the response of RPU 820 to a voltage pulse that reaches $V_{DD}$. Different RPU devices can show different amounts of change in the conductance value due to positive ($\Delta g^+_{min}$) and negative ($\Delta g^-_{min}$) pulses, for example due to differences in fabrication. Further, FIG. 12 demonstrates on average how much weight change $\Delta w$ will be obtained by the positive and negative pulsing scheme shown in FIGS. 11A and 11B.

Figures 22A, 22B:
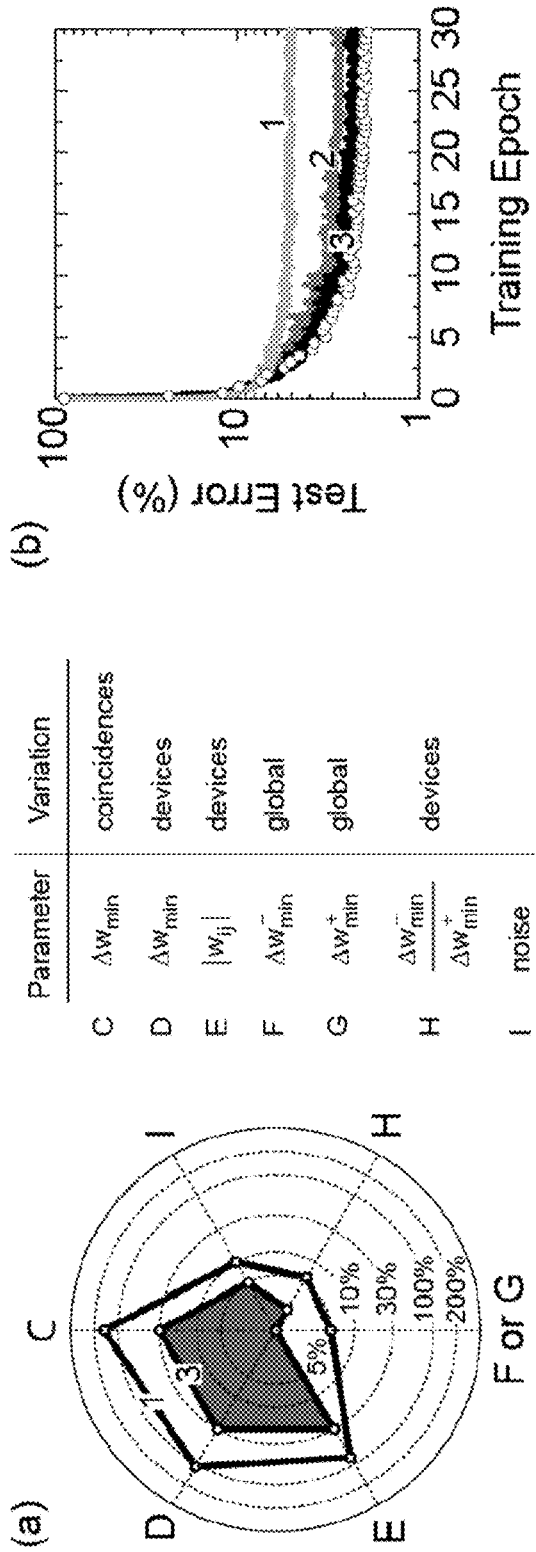
FIG. 22A illustrates example threshold values for the RPU device according to one or more embodiments of the present invention.
FIG. 22B shows training results when effects of more than one parameter of FIG. 22A are combined according to one or more embodiments of the present invention.

Asymmetric RPU devices in an RPU array with different $\Delta w^+_{min}$ and $\Delta w^-_{min}$ adversely affect the DNN training. The incremental conductance change $\Delta g^+_{min}$ and $\Delta g^-_{min}$ translates to an incremental weight change $\Delta w^+_{min}$ and $\Delta w^-_{mi}$. These two quantities ($\Delta g$ and $\Delta w$) are proportional to each other that is determined by the peripheral circuits. For example, FIG. 22A illustrates example threshold values for the RPU device 820 for a predetermined error penalty value of 0.3%. It is understood that the threshold values would be different in different examples using a different predetermined error penalty value. For example, the thresholds can be determined by performing specific "stress tests" where, in each stress test a single parameter is scanned while all the others are fixed to determine the acceptable RPU device parameters that the algorithm can tolerate without significant error penalty. Accordingly, Line 1 in FIG. 22A shows the threshold values corresponding to parameters C-I listed in FIG. 22A, which include parameters such as, incremental conductance change due to a single coincidence event, asymmetry in up and down conductance changes, tunable range of the conductance values, and various types of noise in the system. Further, in FIG. 22A, the gray shaded area bounded by line 3 results in at most 0.3% error penalty when all parameters are combined.

FIG. 22B shows training results when effects of more than one parameter of FIG. 22A are combined. When all parameters (C, D, E, F, G, H, and I) are combined at the threshold the test error reaches 5.0% that is 3.0% above the baseline model (see FIG. 9A and FIG. 9B). Although this penalty can be acceptable for some applications, it is significantly higher than the 0.3% error penalty considered above. Further, the 3.0% penalty is higher than a simple additive impact of uncorrelated contributions indicating that at least some of these parameters are interacting. For example, the model that combines only parameters C, D, and E, at the threshold as shown by curve 2 in FIG. 22B gives 0.9% error penalty that is about the expected sum of individual contributions. Because the parameters C, D, and E, are defined by imperfections in device operation and by device-to-device mismatch that are all controlled by fabrication tolerances in a given technology, the contributions of C, D, and E to the error penalty can be eliminated by setting the corresponding tolerances to 30%.

In one or more examples, the model illustrated by the gray shaded area bounded with curve 3 in FIG. 22A, and corresponding curve 3 in FIG. 22B achieves at most the predetermined 0.3% error penalty by setting parameters C, D, and E to 30%, F (or G) to zero, H to 2%, and I is to 6%. Such settings facilitates maintaining the O(1) time complexity for the DNN training. As can be seen, among the parameter settings, the asymmetry between up and down changes in the conductance value (Δg) of the RPU devices (parameter F, G, and H) is the most restrictive. The DNN algorithm can tolerate only up-to 5-6% asymmetry on RPU devices and, hence the asymmetry puts a tight constraint on RPU device specifications.

The technical solutions described further facilitate relaxing the constraint, on an asymmetric RPU. For example, the constraint can be relaxed by about a factor of 2. In one or more examples, the technical solutions facilitate relaxing the constraint by identifying the asymmetric RPU devices in the RPU array and disabling (killing, burning) the identified RPU devices with electrical signals before the DNN training.

For example, the asymmetry on each RPU device is measured serially, and if the asymmetry is above a predetermined asymmetry threshold value, the RPU device is disabled by application of voltage pulses above a specific threshold. The voltage pulses above the specific threshold physically burn (or kill) the RPU device in the RPU array. In one or more examples, the killed RPU devices are stuck at a small weight value instead of being updated by the training algorithm. The asymmetric RPU devices are disabled before the DNN training initiates.

Figure 23:
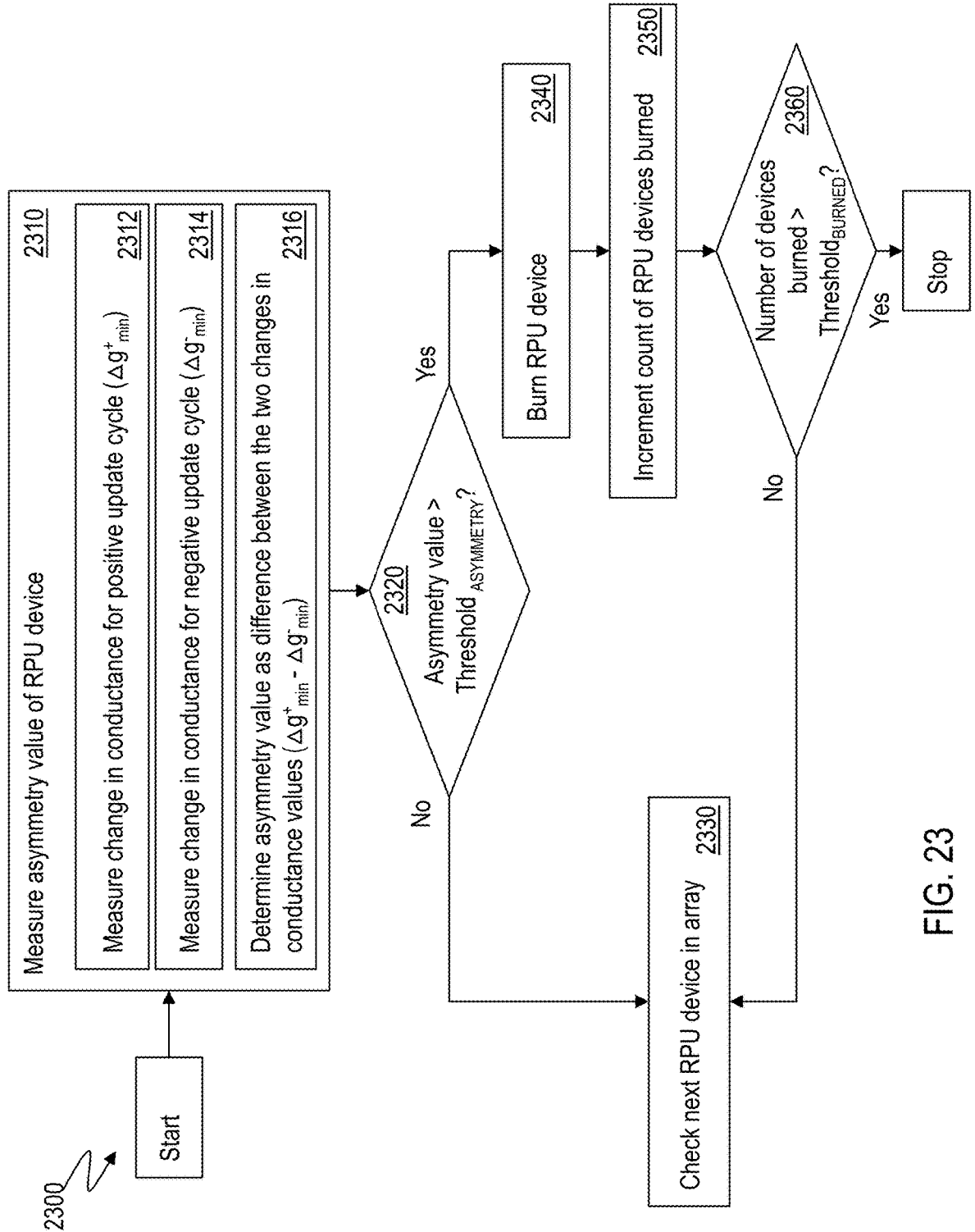
FIG. 23 illustrates a flowchart of an example method for disabling one or more RPU devices in an RPU array according to one or more embodiments of the present invention.

FIG. 23 illustrates a flowchart of an example method 2300 for disabling one or more RPU devices in the RPU array based on corresponding asymmetry values. In one or more examples, the neuron control system 1900 implements the method 2300, for example via the processor 1902. The neuron control system 1900 implements the method before initiating the DNN training. By disabling the one or more RPU devices, the neuron control system 1900 uses fewer parameters for training the DNN.

The neuron control system 1900 measures the asymmetry value of the RPU device 820, as shown at block 2310. Measuring the asymmetry value includes initiating one or more positive and a negative pulses and measuring the corresponding effect on the conductance of the RPU device 820 as shown at blocks. For example, the neuron control system 1900 applies a sequence of predetermined voltage pulses to the RPU device 820 in the RPU array and monitors the corresponding effect on the conductance values of the RPU device 820, by measuring the current that passes through the RPU device 820. An asymmetry value for the RPU device 820 is determined based on the difference in the changes for the positive pulse(s) ($\Delta g^+_{min}$) and negative ($\Delta g^-_{min}$) pulse(s), as shown at blocks 2312, 2314, and 2316.

The asymmetry value of the RPU device 820 is compared with a predetermined asymmetry threshold value, as shown at block 2320. The asymmetry threshold value is a numeric value, such as 5%, or the like and is defined by $$\frac{\Delta g^+_{min} - \Delta g^-_{min}}{(\Delta g^+_{min} + \Delta g^-_{min})/2}.$$

If the asymmetry value is above the predetermined asymmetry threshold value, the neuron control system 1900 disables the RPU device 820, as shown at block 2340. For example, the neuron control system 1900 disables the RPU device 820 by physically burning the RPU device 820, by passing a voltage above the predetermined limit of the RPU device 820. In one or more examples, the neuron control system 1900 applies a voltage above a predetermined limit on the corresponding column 814 and a voltage below a predetermined limit on the corresponding row 806 of the RPU device 820 (or vice versa) that causes the RPU device 820 to burn. The neuron control system 1900 accordingly reduces the asymmetry of the RPU array.

In one or more examples, the neuron control system 1900 keeps track of a number of asymmetric RPU devices burned in this manner. For example, the neuron control system 1900 increments a count of burned RPU devices after disabling the RPU device 820, as shown at block 2350. The neuron control system 1900 checks whether a predetermined threshold number of RPU devices have been disabled by comparing the count with the predetermined threshold, as shown at block 2360. The predetermined threshold can be a percentage value of the total number of RPU devices in the array, for example 10%, or 5%, or the like. If the predetermined threshold value is met, the neuron control system 1900 stops and initiates the DNN training. Alternatively, the neuron control system 1900 checks a next RPU device of the RPU array, as shown at block 2330. Further, in case the asymmetry value of the RPU device 820 is below the predetermined asymmetry threshold value, the neuron control system 1900 does not disable the RPU device 820, and continues to check the next RPU device, as shown at block 2330. The neuron control system 1900, in one or more examples, can check all the RPU devices in the array.

Figure 24:
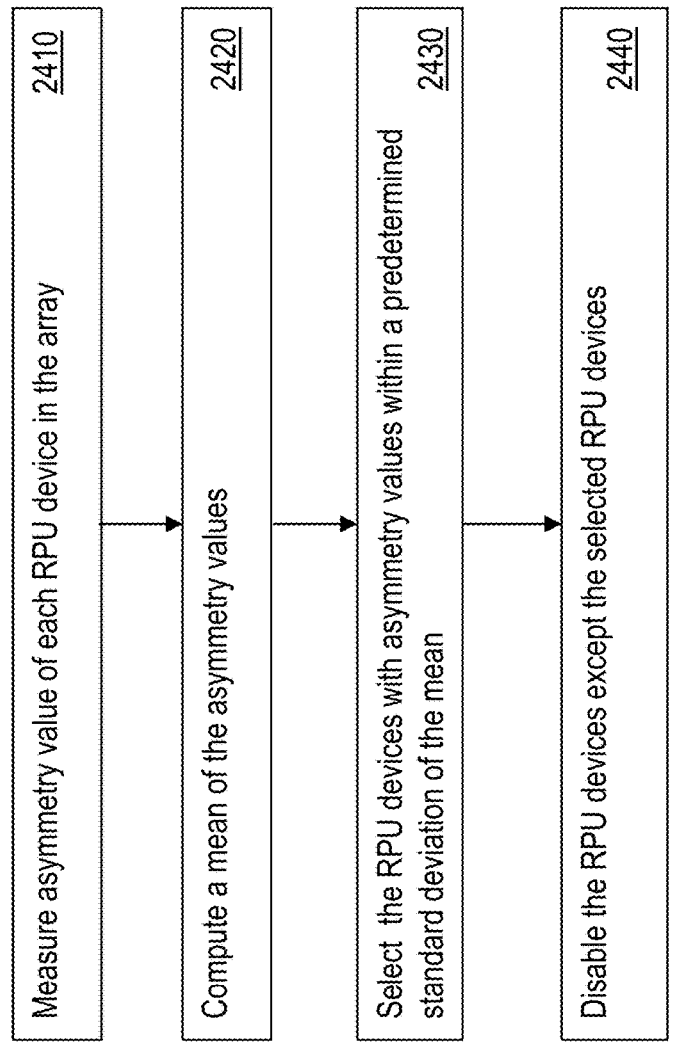
FIG. 24 illustrates a flowchart of an example method for disabling one or more RPU devices in an RPU array according to one or more embodiments of the present invention.

FIG. 24 illustrates a flowchart of an example method 2400 for disabling the one or more asymmetric RPU devices in the RPU array. In one or more examples, the neuron control system 1900 implements the method 2400, for example via the processor 1902. The neuron control system 1900 measures the asymmetry values of each RPU device 820 in the RPU array, as shown at block 2410. The asymmetry values are measured as described herein. The neuron control system 1900 further determines a mean of the asymmetry values, as shown at block 2420. The neuron control system 1900 further identifies or selects the RPU devices that have asymmetry values within a predetermined standard deviation from the mean, as shown at block 2430. For example, the predetermined standard deviation can be 5%, 10%, or any other value. The neuron control system 1900 keeps the selected RPU devices and disables the remaining RPU devices in the array by burning the other RPU devices, as shown at block 2440. The RPU devices are physically burned by applying high voltage values as described herein.

Figure 25:
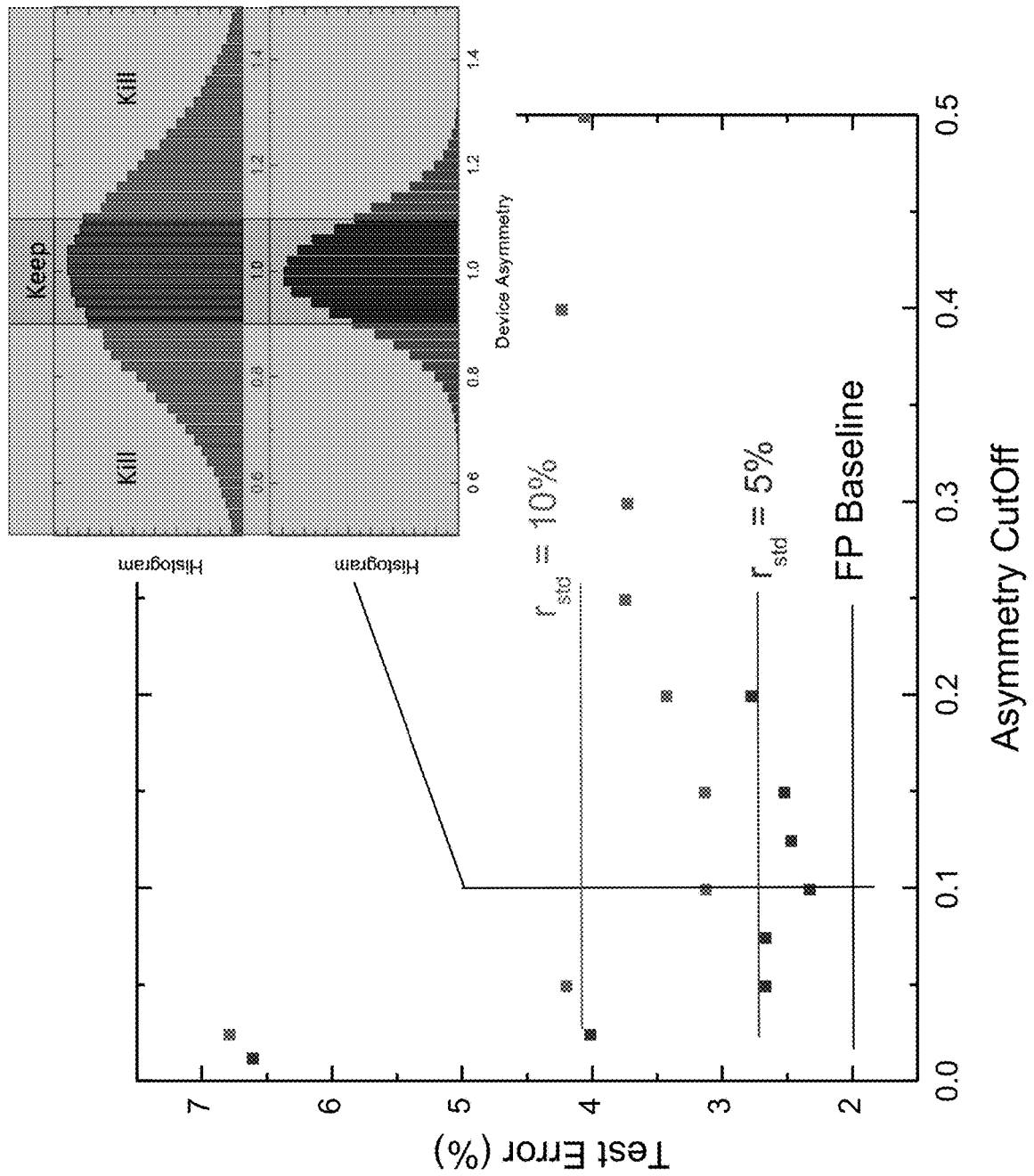
FIG. 25 illustrates an example effect of disabling RPU devices on error penalty associated with training an RPU array according to one or more embodiments of the present invention.

FIG. 25 illustrates an example effect of disabling RPU devices on error penalty associated with the training of the RPU array. As illustrated, using by selecting the RPU devices within 5% ($r_{std}$=5%) of the mean of asymmetric values, the error penalty is well within the 0.3% predetermined error threshold from the FP baseline. Further, FIG. 25 also illustrates that selecting the RPU devices within 10% of the mean of the asymmetric values ($r_{std}$=10%), the error penalty is within the 0.3% predetermined error penalty threshold. Thus, even by disabling RPU devices, and effectively reducing a number of neurons that are trained using the DNN training, the neuron control system 1900 improves accuracy of the system. It is understood that the above are examples of predetermined thresholds, and that in other embodiments different predetermined thresholds values can be used.

Accordingly, embodiments of the present invention provide a number of technical benefits. A single, two-terminal device uses a non-linear switching characteristic of the device, along with encoded input bit streams to locally perform weight updates that consume low power and accelerate machine learning in ANNs formed from crossbar arrays of the non-linear RPUs. The described RPU can locally perform the processing and storage steps necessary to perform forward pass matrix multiplication, backward pass matrix multiplication and weight updates. The RPU can accelerate a variety of training methodologies, including online neural network training, matrix inversion and matrix decomposition.

Further, by disabling a subset of the RPU devices in the RPU array based on asymmetry values of the RPU devices facilitates relaxing specifications for asymmetric devices, such as to about ~10% from ~5%, without affecting accuracy of the DNN training. The RPU devices that are disabled before the DNN training are selected by measuring asymmetry values of the RPU devices and largely asymmetric devices are disabled before beginning of the training. The largely asymmetric RPU devices are selected using one or more techniques described herein.

Parts of one or more embodiments may be a device, a system, a method and/or a computer program product. The computer program product in accordance with one or more embodiments includes a computer readable storage medium (or media) having program instructions thereon for causing a processor to carry out aspects of one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A resistive processing unit (RPU) array control system comprising:
    an RPU array comprising:
        a set of conductive row wires;
        a set of conductive column wires configured to form a plurality of crosspoints at intersections between the set of conductive row wires and the set of conductive column wires; and
        a plurality of RPUs, wherein an RPU is located at each of the plurality of crosspoints, wherein a conduction state of the RPU identifies a weight of a training methodology applied to said RPU; and
    a controller configured to:
        measure asymmetry values of each of the RPUs by:
            measuring a first change in the conduction state of the RPU caused by a positive pulse;
            measuring a second change in the conduction state of the RPU caused by a negative pulse; and
            determining the asymmetry value of the RPU as a difference between the first change and the second change; and
        burn a selected subset of RPUs from the plurality of the RPUs based on the corresponding asymmetry values.

2. The resistive processing unit (RPU) array of claim 1, wherein burning the selected subset of RPUs comprises sending one or more electric signals that cause a voltage above a predetermined limit at the selected subset of RPUs.

3. The resistive processing unit (RPU) array of claim 2, wherein burning an RPU from the selected subset of RPUs comprises: sending a first encoded signal above a first predetermined limit to a first terminal if the RPU and sending a second encoded signal below a second predetermined limit to a second terminal of the RPU.

4. The resistive processing unit (RPU) array of claim 2, wherein the RPU array receives the one or more electric signals that burn the selected subset of RPUs before initiating the training methodology.

5. The resistive processing unit (RPU) array of claim 2, wherein the one or more electric signals are directed to the selected subset of RPUs based on corresponding crosspoints between the set of conductive row wires and the set of conductive column wires.

6. The resistive processing unit (RPU) array of claim 1, wherein the selected subset of RPUs is selected based on corresponding asymmetry values being above a predetermined asymmetry threshold.

7. The resistive processing unit (RPU) array of claim 1, wherein the selected subset of RPUs is selected based on corresponding asymmetry values being above outside a predetermined standard deviation of a mean of the asymmetry values of the plurality of RPUs.

8. The resistive processing unit (RPU) array of claim 1, wherein the change in the conduction state comprises a non-linear change based on at least one first encoded signal applied to a first terminal and at least one second encoded signal applied to a second terminal of the RPU.

9. The resistive processing unit (RPU) array of claim 1, wherein each RPU comprises:
    a first terminal;
    a second terminal; and
    an active region having the conduction state;
    wherein the active region is configured to locally perform a data storage operation of the training methodology; and
    wherein the active region is further configured to locally perform a data processing operation of the training methodology.

10. A neuron control system facilitating training a resistive processing unit (RPU) array, the neuron control system comprising:
    the RPU array, which comprises a plurality of RPUs; and
    a processor configured to reduce asymmetric RPUs from the RPU array by:
        measuring asymmetry values of each of the RPUs by:
            measuring a first change in a conduction state of an RPU caused by a positive pulse;
            measuring a second change in the conduction state of the RPU caused by a negative pulse; and
            determining the asymmetry value of the RPU as a difference between the first change and the second change; and
        burning a selected subset of RPUs from the plurality of the RPUs, the subset of RPUs selected based on the corresponding asymmetry values.

11. The neuron control system of claim 10, wherein each RPU comprises:
a first terminal;
a second terminal; and
an active region having a conduction state; and
wherein the active region is configured to effect a non-linear change in the conduction state based on at least one first encoded signal applied to the first terminal and at least one second encoded signal applied to the second terminal.

12. The neuron control system of claim 11, wherein the processor burns the RPU by sending the first encoded signal above a first predetermined limit and sending the second encoded signal below a second predetermined limit.

13. The neuron control system of claim 10, wherein the RPU array comprises:
a set of conductive row wires;
a set of conductive column wires configured to form a plurality of crosspoints at intersections between the set of conductive row wires and the set of conductive column wires; and
a two-terminal RPU at each of the plurality of crosspoints.

14. The neuron control system of claim 13, wherein the RPU that is burned is a first RPU from the RPU array, and wherein the RPU array further comprises a second RPU that is not burned, the second RPU comprising an active region having a conduction state,
wherein the active region is further configured to locally perform a data storage operation of a training methodology based at least in part on a non-linear change in the conduction state; and
wherein the active region is further configured to locally perform a data processing operation of the training methodology based at least in part on the non-linear change in the conduction state.

15. The neuron control system of claim 10, wherein the processor is further configured to initiate training methodology for the RPU array, wherein the processor reduces the asymmetric RPUs from the RPU array prior to initiating the training methodology.

16. The neuron control system of claim 10, wherein the selected subset of RPUs is selected based on corresponding asymmetry values being above a predetermined asymmetry threshold.

17. The neuron control system of claim 10, wherein the selected subset of RPUs is selected based on corresponding asymmetry values being above outside a predetermined standard deviation of a mean of the asymmetry values of the plurality of RPUs.

18. A non-transitory computer program product for training a resistive processing unit (RPU) array, the computer program product comprising computer readable storage medium with computer executable instructions embedded therein, wherein the computer readable storage medium comprises instructions to:
reduce asymmetric RPUs from the RPU array by:
measuring asymmetry values of each of the RPUs by:
measuring a first change in a conduction state of an RPU caused by a positive pulse;
measuring a second change in the conduction state of the RPU caused by a negative pulse; and
determining the asymmetry value of the RPU as a difference between the first change and the second change; and
burning a selected subset of RPUs from the plurality of the RPUs, the subset of RPUs selected based on the corresponding asymmetry values; and
initiate a training methodology for the RPU array after the asymmetric RPUs from the RPU array are reduced.

19. The non-transitory computer program product of claim 18, wherein the RPU is burned by sending a first encoded signal above a first predetermined limit and sending a second encoded signal below a second predetermined limit to a first terminal and a second terminal of the RPU respectively.

20. The non-transitory computer program product of claim 18, wherein the selected subset of RPUs is selected based on corresponding asymmetry values being above outside a predetermined standard deviation of a mean of the asymmetry values of the plurality of RPUs.

* * * * *